(12) United States Patent
Littlefield et al.

(10) Patent No.: US 12,545,170 B2
(45) Date of Patent: Feb. 10, 2026

(54) METHOD OF MANUFACTURING A VEHICLE BODY

(71) Applicant: International RV Manufacturing, LLC, Americus, GA (US)

(72) Inventors: Derwood L. Littlefield, Rockwood, TN (US); Juan Santana, Americus, GA (US)

(73) Assignee: International RV Manufacturing, LLC, Americus, GA (US)

( * ) Notice: Subject to any disclaimer, the term of this patent is extended or adjusted under 35 U.S.C. 154(b) by 637 days.

(21) Appl. No.: 18/163,555

(22) Filed: Feb. 2, 2023

(65) Prior Publication Data

US 2023/0322147 A1    Oct. 12, 2023

Related U.S. Application Data

(60) Provisional application No. 63/329,793, filed on Apr. 11, 2022.

(51) Int. Cl.
| | | |
|---|---|---|
| *B60P 3/32* | (2006.01) | |
| *B62D 29/04* | (2006.01) | |
| *B62D 33/04* | (2006.01) | |
| *B62D 65/04* | (2006.01) | |
| *B60N 3/10* | (2006.01) | |
| *B62D 21/20* | (2006.01) | |
| *B62D 24/02* | (2006.01) | |

(52) U.S. Cl.
CPC .............. *B60P 3/32* (2013.01); *B62D 29/043* (2013.01); *B62D 33/046* (2013.01); *B62D 65/04* (2013.01); *B60N 3/101* (2013.01); *B62D 21/20* (2013.01); *B62D 24/02* (2013.01)

(58) Field of Classification Search
CPC . B60P 3/32; B60P 3/34; B62D 29/043; B62D 33/046; B62D 33/0612; B62D 65/04
USPC .................................................. 296/156, 168
See application file for complete search history.

(56) References Cited

U.S. PATENT DOCUMENTS

| | | | | |
|---|---|---|---|---|
| 3,807,789 | A * | 4/1974 | Turquin | .................... B60P 3/32 |
| | | | | 296/168 |
| 7,390,052 | B2 * | 6/2008 | Bertoch | ................. B62D 21/20 |
| | | | | 296/156 |
| 8,690,226 | B2 * | 4/2014 | Ellis | ....................... B62D 65/04 |
| | | | | 296/181.2 |
| 11,446,960 | B2 | 9/2022 | Galang et al. | |
| 11,511,604 | B2 | 11/2022 | Johananoff | |

(Continued)

*Primary Examiner* — Jason S Daniels
(74) *Attorney, Agent, or Firm* — Peter L. Brewer; Thrive IP

(57) ABSTRACT

An over-the-road vehicle. The vehicle comprises a chassis, and an envelope supported on the chassis. The envelope comprises a first continuous sheet of material folded over to form a front wall, a back wall, an overhead panel, and at least a portion of a floor panel. The envelope also includes a second continuous sheet of material forming a left side panel, and a third continuous sheet of material forming a right side panel. The left side panel is thermoplastically welded onto the first sheet of material on a left side of the chassis. Similarly, the right side panel is thermoplastically welded onto the first sheet of material on a right side of the chassis. Each of the first, second, and third sheets of material is fabricated from at least one malleable fiberglass sheet and a thermoplastic core. A method of fabricating an envelope for a vehicle is also provided herein.

46 Claims, 14 Drawing Sheets

(56) References Cited

U.S. PATENT DOCUMENTS

| | | | |
|---|---|---|---|
| 12,168,480 B2 * | 12/2024 | Storz | B62D 33/048 |
| 2015/0102631 A1 * | 4/2015 | Maclean | B62D 33/046 |
| | | | 296/156 |
| 2022/0106807 A1 | 4/2022 | Tibbetts | |
| 2022/0220740 A1 | 7/2022 | Thompson | |
| 2022/0410426 A1 | 12/2022 | Tezza et al. | |
| 2023/0001626 A1 | 1/2023 | Gläßer et al. | |
| 2023/0031269 A1 | 2/2023 | Korada et al. | |
| 2023/0033406 A1 | 2/2023 | Sayles | |

\* cited by examiner

METHOD OF MANUFACTURING A VEHICLE BODY

STATEMENT OF RELATED APPLICATIONS

This application claims the benefit of U.S. Ser. No. 63/329,793 filed Apr. 11, 2022. That application is entitled "Method of Assembling an RV Housing" and is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce selected aspects of the art, which may be associated with various embodiments of the present disclosure. This discussion is believed to assist in providing a framework to facilitate a better understanding of particular aspects of the present disclosure. Accordingly, it should be understood that this section should be read in this light and not necessarily as admissions of prior art.

Field of the Invention

The present disclosure relates to the field of over-the-road vehicles. More specifically, the present invention relates to a method of manufacturing a vehicle using a durable but malleable and thermally-insulative material as a housing. The vehicle may include, but is not limited to, a recreational vehicle (RV), a box trailer, or an integrated box truck.

Discussion of Technology

Beginning with the introduction of the moving assembly line by Henry Ford, automobiles have been almost exclusively manufactured through mass production. Hundreds, if not thousands of cars and trucks, are manufactured to near-identical specifications along an assembly line using interchangeable parts and streamlined operations. In contrast, boats, recreational vehicles, and certain specialty delivery vehicles tend to be custom products which are not assembled via the assembly line process.

With respect to over-the-road vehicles, there are generally two types of vehicle housings used in the construction of recreational vehicles (RVs) and box trailers. The first type is referred to as stick-and-tin, while the second type is referred to as laminated wall construction. Both types of vehicle housings are built on a prefabricated chassis, with the chassis being supported by at least one axle having wheels. In some instances, the chassis may be supported by multiple axles having wheels.

In both types, a manufacturer will assemble and dress a chassis with fuel and water plumbing, fuel tank(s), and fresh and grey water tanks. In addition, 12-Volt direct current wiring is provided. The wiring is used for signal lights, sensors, electric breaking, and to bring battery power from a storage source to an energy hub inside the vehicle. Tires may be installed at this stage as well.

Next, the manufacturer will build a flooring on top of the chassis. The flooring may be fabricated from wood, metal, or composite material. Thereafter, a frame structure is erected over the chassis.

In the case of stick-and-tin housing, panels are then secured to the frame in order to form a shell. Next, the manufacturer will build a frame with several hundred (or even thousands) of pieces of two-by-two sticks. The sticks are typically made of wood; hence, the reference to sticks.

Next, electrical cabling and plumbing are run so they remain inside the wall, between and through the sticks. Insultation is sprayed, laid, or squeezed between the sticks, and an outside layer of channeled tin sheets is riveted in place. Hence, the reference to tin. Openings are then cut-out through the tin, and exterior lights and covers are installed. Inlets, outlets, vents, and all other services requiring exterior access are also installed. Other services requiring exterior access may include doors, ramps, and roll-up garage style doors. The manufacturer will then install inside panels, or finishing material, to serve as walls and ceiling liners.

As noted, the second type of vehicle housing is called a laminated wall construction. In this instance, an aluminum or metal framed floor is installed on top of the chassis. Some vehicle manufacturers will make this floor from a single part or on various pieces of metal-framed structure, which is then covered with metal laminate, composites, or wood as the "walk-on" material. An aluminum frame is independently welded for every wall (four in total). When the unit is large, a wall may be composed of several separately assembled frames. The walls and floor comprise the shell of the vehicle, which is commonly referred to as an "envelope."

The walls' inner frames are filled with high-density insulating foam or other insulative material. A so-called sandwich is made by covering the outer side with a metal lined sheet and the inner side with plywood or composites using an adhesive. This assembly is then run through a heavy roller. The resulting sandwiched pieces are fixed as front wall, rear wall, right wall, and left wall, with all necessary cut-out openings for doors, windows, vents, and all services. Securing processes vary from screwing-in to TIG welding to using rivets or clamps.

Next, the roof frame is installed, insulated, and covered with a high-quality tarp using trade-specific adhesives. Openings for vents and services may be pre-cut, or they may be cut-out at this stage. Inside, electrical and plumbing appliances are installed. Note that no electricity or plumbing runs inside the walls as this is done under the habitable space, or inside of it. This is a key difference between stick-and-tin construction and laminated walls construction. The manufacturer will then install inside panels, or finishing material, to serve as walls and ceiling liners.

As can be seen, the processes of assembling the envelope for a vehicle requires a number of cutting, welding, and riveting steps. This process is time consuming and, in some cases, inexact. Additionally, this process require significant labor inputs, training of personnel, and assembly space.

Accordingly, a need exists for a method of manufacturing a vehicle wherein a single sheet of material may be cut and folded over in order to form the shell, or envelope, for the vehicle. A need further exists for such a method wherein the material used for the shell itself provides thermal and acoustic insulation as well as structural strength. A need further exists for a method of forming interior cabinetry also using a single sheet of material that is cut and folded. In this instance, the cabinetry itself also helps provide structural stability.

BRIEF SUMMARY OF THE INVENTION

An over-the-road vehicle is provided herein. The over-the-road vehicle first comprises a chassis. The chassis serves as a base frame for the over-the-road vehicle. The chassis will be supported above a ground surface by an axle and at least two wheels. In one aspect, the chassis may be supported above the ground surface by more than one axle and at least two wheels per axle.

The chassis may be a trailer that is connectable to a vehicle. Alternatively, the chassis may be a part of a truck frame.

The over-the-road vehicle also comprises an envelope. The envelope is supported on the chassis and serves as an insulating housing for the over-the-road vehicle. The insulated housing may be a shell for a travel trailer, or RV. Alternatively, the insulated housing may be cargo compartment for a commercial truck.

The envelope is fabricated from a series of continuous sheets of material. These represent:
- a first continuous sheet of material folded over to form a front wall, an overhead panel, a back wall, and at least a portion of a lower panel;
- a second continuous sheet of material forming a left side panel; and
- a third continuous sheet of material forming a right side panel.

Each of the first, second, and third continuous sheets of material are fabricated from at least one pliable fiberglass sheet. Preferably, the continuous sheets of material are formed from:
- a first fiberglass sheet;
- a second fiberglass sheet; and
- a composite sheet residing between the first and second fiberglass sheets, with each of the first and second fiberglass sheets being bonded to the composite sheet to form a shell material.

Preferably, the first continuous sheet is folded over to form the front wall, the back wall, the overhead panel, and then front and rear portions of the lower panel. Preferably, the front and rear portions of the lower panel together represent 20% to 40% of a length of a floor panel.

The left side panel is secured to the first continuous sheet of material on a first side of the envelope, while the right side panel is secured to the first continuous sheet of material on a second side of the envelope. This may be done through, for example, thermoplastic welding. The envelope then further comprises a fourth continuous sheet of material that forms a remaining 60% to 80% length of the floor panel.

Optionally, the floor panel also comprises a first fiberglass sheet, a second fiberglass sheet, and a composite sheet residing between the first and second fiberglass sheets. This becomes a part of the envelope. The floor panel may additionally include thermoplastic welded tire fenders. Preferably, thermoplastic welding is also used to join the floor panel to the left and right side panels. In either instance, the floor panel straddles, or resides between, the front and rear portions of the lower panel.

In one aspect, the over-the-road vehicle also includes at least two shims. The shims are placed between the chassis and the floor panel and are arranged to secure the first continuous sheet of material to the floor panel. More specifically, a first end of the floor panel (which may be referred to as a fourth continuous sheet of material) is secured to a front portion of the lower panel, forming a front joint, while a second end of the fourth continuous sheet of material is secured to a rear portion of the lower panel, forming a back joint.

In another aspect, four stainless steel shims are employed—two on the front joint and two on the back joint. Overlapping shims are riveted to the first and fourth continuous sheets of material to provide the full floor panel. Alternatively, or in addition, a high-performance adhesive may be used to secure the overlapping shims to the first and fourth continuous sheets of material.

The floor panel is bolted onto the chassis after drilling through the floor panel. This may be done before or after the entire envelope is formed and serves to connect the floor panel to the chassis. Openings for doors, windows and vents may be pre-cut into any of the first, second, and third continuous sheets of material.

A method of fabricating an over-the-road vehicle is also provided herein. In one aspect, the method first comprises providing a chassis. The chassis serves as a base frame for the over-the-road vehicle.

The method also includes providing an envelope. The envelope may be in accordance with the three-dimensional shell described above. In this respect, the envelope may comprise:
- a first continuous sheet of material folded over to form a front wall, an overhead panel, a back wall, and at least a portion of a lower panel;
- a second continuous sheet of material forming a left side panel; and
- a third continuous sheet of material forming a right side panel.

Each of the first, second, and third continuous sheets of material are fabricated from at least one pliable fiberglass sheet. Preferably, the first continuous sheet is folded over to form the front wall, the back wall, the overhead panel, and then front and rear portions of the lower panel.

The method also includes thermoplastically welding the left side panel onto the first continuous sheet of material on a first side of the envelope. The method additionally includes thermoplastically welding the right side panel onto the first continuous sheet of material on a second side of the envelope.

Preferably, the front and rear portions of the lower panel together represent 20% to 40% of a length of a floor panel. The envelope then further comprises a fourth continuous sheet of material forming a remaining 60% to 80% length of the floor panel. The fourth continuous sheet of material is placed between the front and rear portions of the first continuous sheet of material after the first continuous sheet of material has been folded over.

The method may then further include:
- mechanically connecting a first end of the fourth continuous sheet of material to a front portion of the lower panel, and
- mechanically connecting a second end of the fourth continuous sheet of material to a rear portion of the lower panel.

The mechanically connecting steps may include riveting the fourth continuous sheet of material to the front and rear portions of the lower panel using overlapping shims. In another aspect, the mechanically connecting steps may include thermoplastically welding the fourth continuous sheet of material to the front and rear portions of the lower panel using overlapping shims. Alternatively, or in addition, a high-performance adhesive may be used.

In one aspect, each of the first, second, third, and fourth continuous sheets of material is comprised of:
- a first fiberglass sheet;
- a second fiberglass sheet; and
- a composite sheet residing between the first and second fiberglass sheets, with each of the first and second fiberglass sheets being bonded to the composite sheet to form a shell material.

The method also comprises bolting the floor panel onto the chassis. This may be done before or after the entire envelope is formed. Together, the envelope may be between 0.5 inches and 2.0 inches in thickness.

DETAILED DESCRIPTION OF CERTAIN EMBODIMENTS

Description of Specific Embodiments

Figure 8:
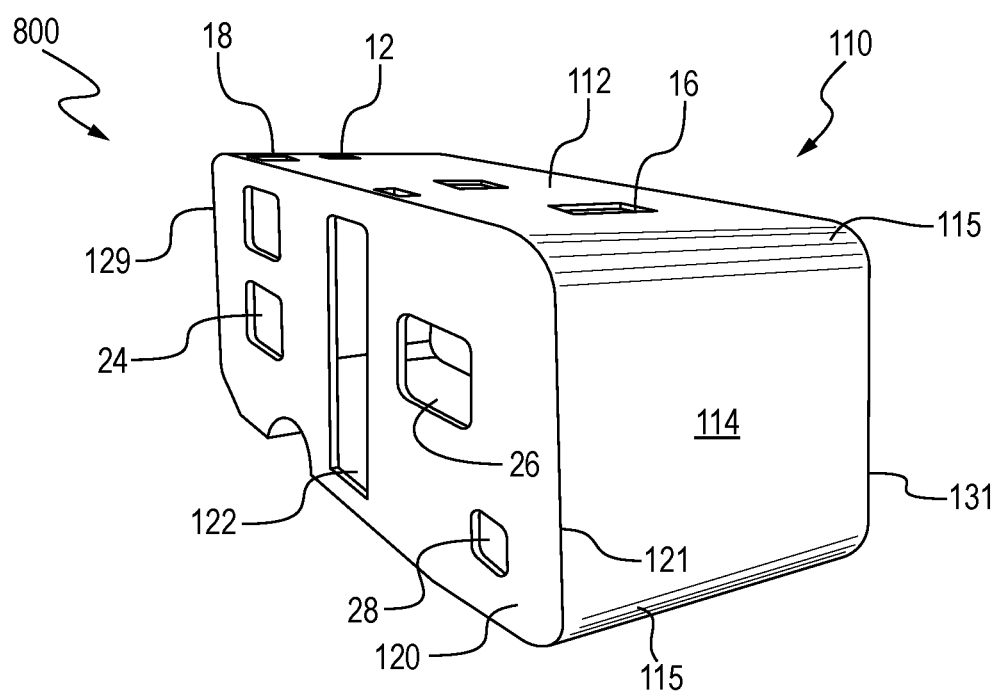
FIG. 8 is a perspective view of the first and second continuous sheets of material from FIGS. 1 and 2, respectively. In this view, the second continuous sheet of material has now been sealingly connected to the first continuous sheet of material relative to the view of FIG. 7A. The envelope has been completed.
Figure 10:
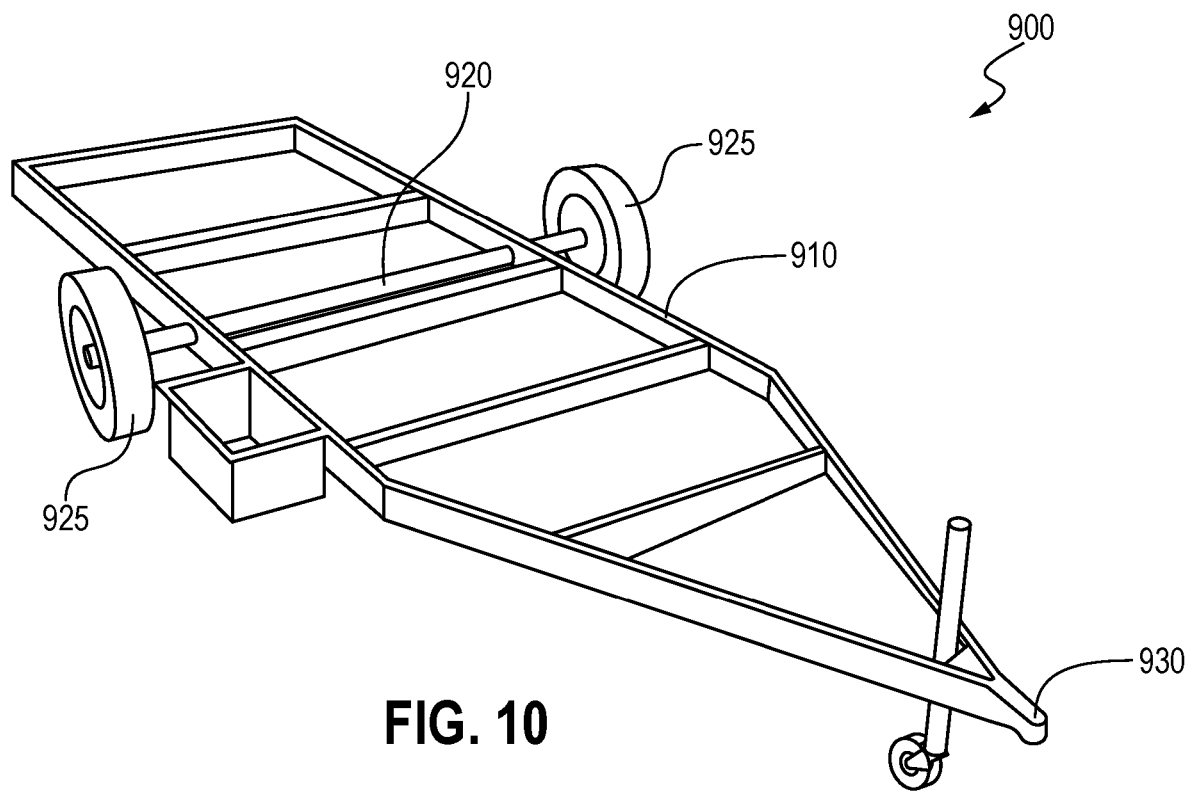
FIG. 10 is a perspective view of a chassis as may be used to support the envelope of FIG. 8. The chassis is in the form of a trailer.

The present disclosure relates to an over-the-road vehicle. The over-the-road vehicle comprises a chassis and an envelope that is supported on the chassis. The chassis serves as a base frame for the over-the-road vehicle, while the envelope serves as a shell, or housing, for the over-the-road vehicle. A perspective view of an envelope 800 in an illustrative arrangement is shown in FIG. 8, while a perspective view of an illustrative chassis 900 is shown in FIG. 10. The over-the-road vehicle may include a recreational vehicle (RV), a box trailer, or an integrated box truck.

Figure 1:
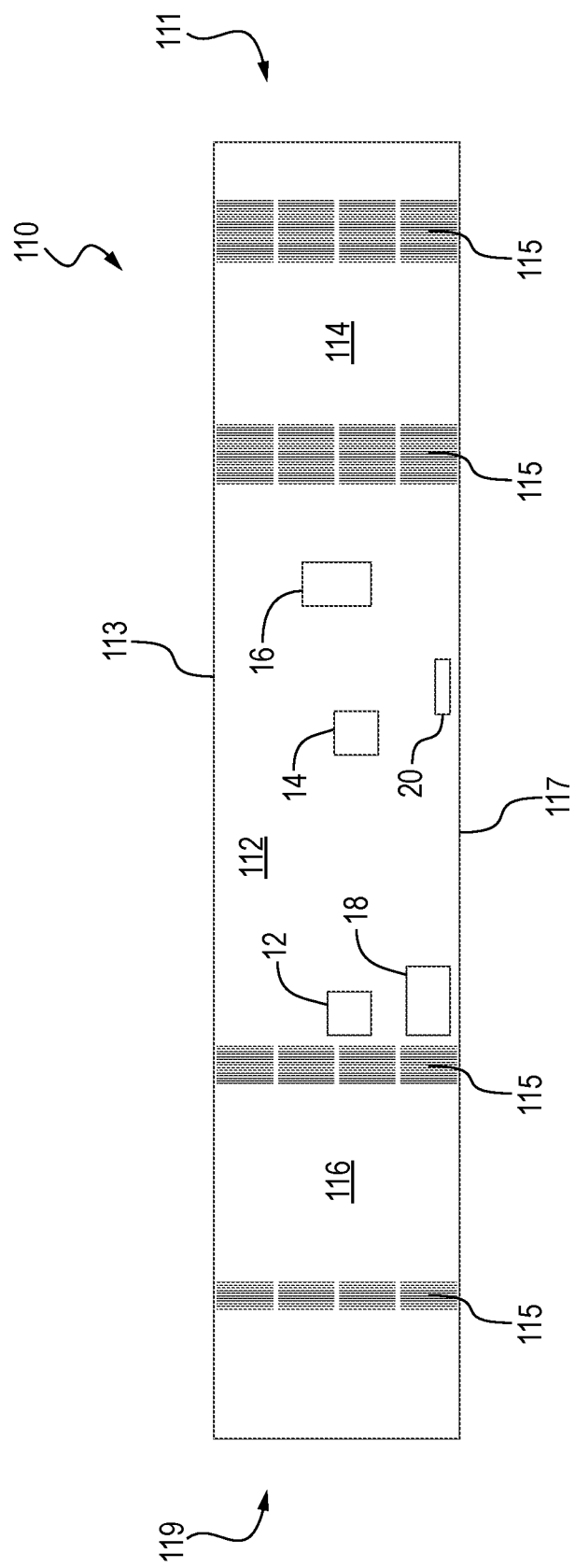
FIG. 1 is a plan view of a first continuous sheet of material used in forming an envelope for an over-the-road vehicle of the present invention, in one embodiment. The first continuous sheet of material includes an overhead panel, opposing front and back panels, and front and rear portions of a floor panel.

FIG. 1 is a plan view of a portion of the envelope 800. This portion represents a first continuous sheet of material 110 used in forming the envelope 800 for an over-the-road vehicle, in one embodiment. The first continuous sheet of material 110 includes an overhead panel 112 and opposing front 114 and back 116 panels.

In the view of FIG. 1, the first continuous sheet of material 110 is laid out as a single planar sheet, generally forming a rectangle. The first continuous sheet of material 110 includes a front end 111 and an opposing rear end 119. Also shown is a left side 113 and a right side 117. The first continuous sheet of material 110 is designed to be folded at four places, indicated by serrations 115. The first continuous sheet of material 110 is presented in a partially folded state in FIG. 5, discussed further below.

The first continuous sheet of material 110 is preferably between 20 feet and 36 feet in length, that is, from the front end 111 to the rear end 119. In addition, the first continuous sheet of material 110 is preferably between 6 feet and 10 feet in width, that is from the left side 113 to the right side 117.

Various openings are pre-cut into the first continuous sheet of material 110. These include openings 12, 14, 16, 18, and 20. These openings 12, 14, 16, 18, and 20 are used for such features as air circulation openings, a sky panel, vent openings, and the like. The number and arrangement of such openings is a matter of designer's choice. Preferably, the openings 12, 14, 16, 18, and 20 are formed using CNC for precision cutting. It should be understood that openings 12, 14, 16, 18, and 20 are not limited to the arrangement shown on the overhead panel 112. In some embodiments, the openings 12, 14, 16, 18, and 20 may be included within the front panel 114 and/or the back panel 116. In these instances, the openings 12, 14, 16, 18, and 20 may also include windows, rear doors, and other means of egress.

Figure 2:
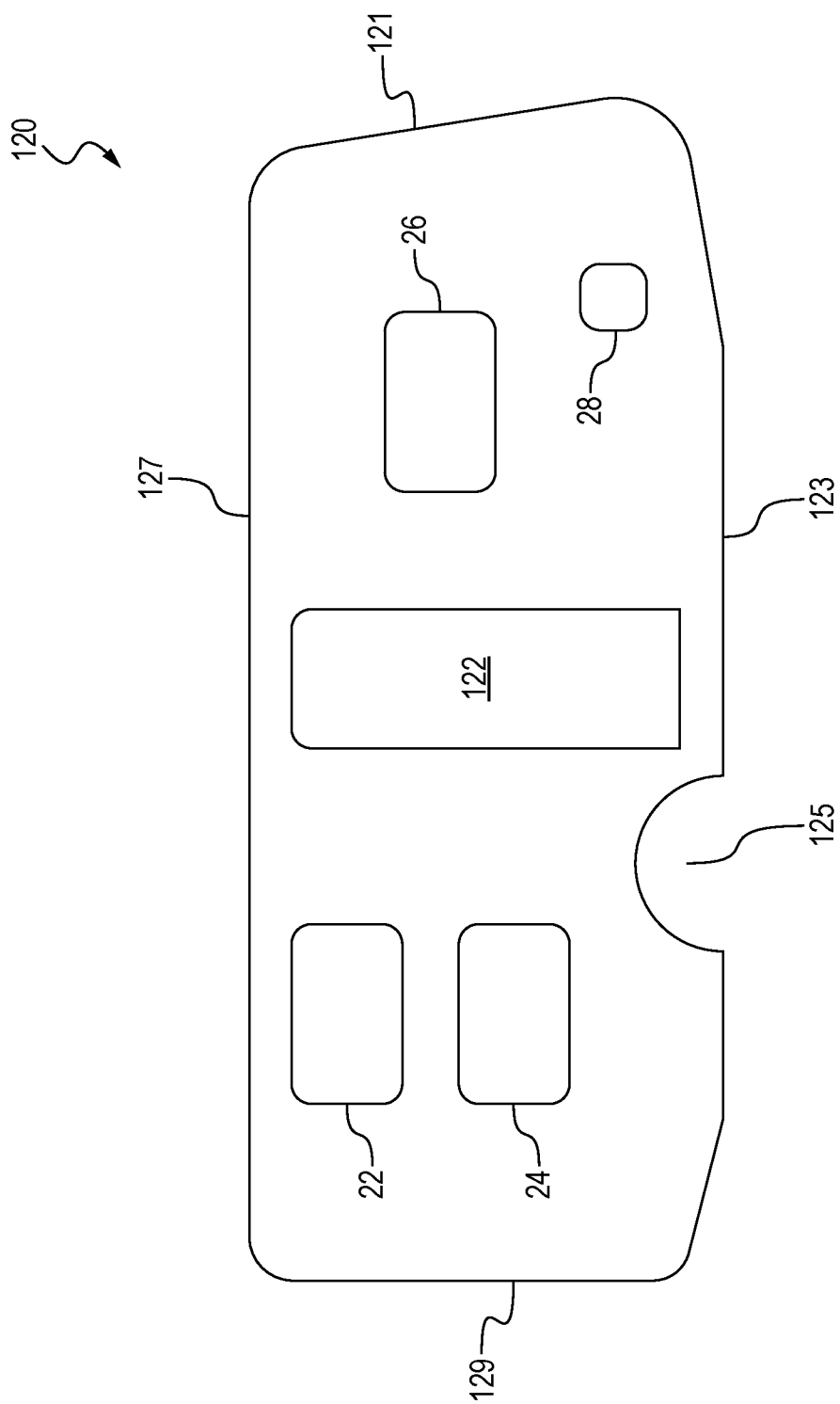
FIG. 2 is a plan view of a second continuous sheet of material used in forming an envelope for the over-the-road vehicle. The second continuous sheet of material forms a right side (or starboard) panel. Illustrative cutouts for a door, windows, and a wheel are visible along the right side panel.

FIG. 2 is a plan view of a second continuous sheet of material 120 used in forming the envelope 800 of FIG. 8.

This second continuous sheet of material 120 also represents a planar material but is used in forming a right side (or starboard side) panel for the over-the-road vehicle.

In the view of FIG. 2, the second continuous sheet of material 120 is laid out as a single planar sheet. The second continuous sheet of material 120 includes a front end 121 and an opposing rear end 129. Also shown is a lower side 123 and an upper side 127.

The second continuous sheet of material 120 is preferably between 12 feet and 20 feet in length, that is, from the front end 121 to the rear end 129. In addition, the second continuous sheet of material 120 is preferably between 6 feet and 10 feet in width, that is from the lower side 123 to the upper side 127. The second sheet 120 is intended to be sealingly secured to the right side 117 of the first continuous sheet of material 110 in forming the envelope 800.

Various openings are pre-cut into the second continuous sheet of material 120. These include an opening 122 for a door. These also include an opening 125 for accommodating at least one right wheel. These further include openings 22, 24, and 26 for accommodating windows, and opening 28 for access to a wet toilet. It is understood that the number and arrangement of such openings is a matter of designer's choice. In some embodiments, the opening 125 for accommodating at least one right wheel may be of such a size and arrangement to accommodate a second wheel in the case of a tandem-axle chassis configuration or in the case of a dual rear wheel configuration.

Figure 3:
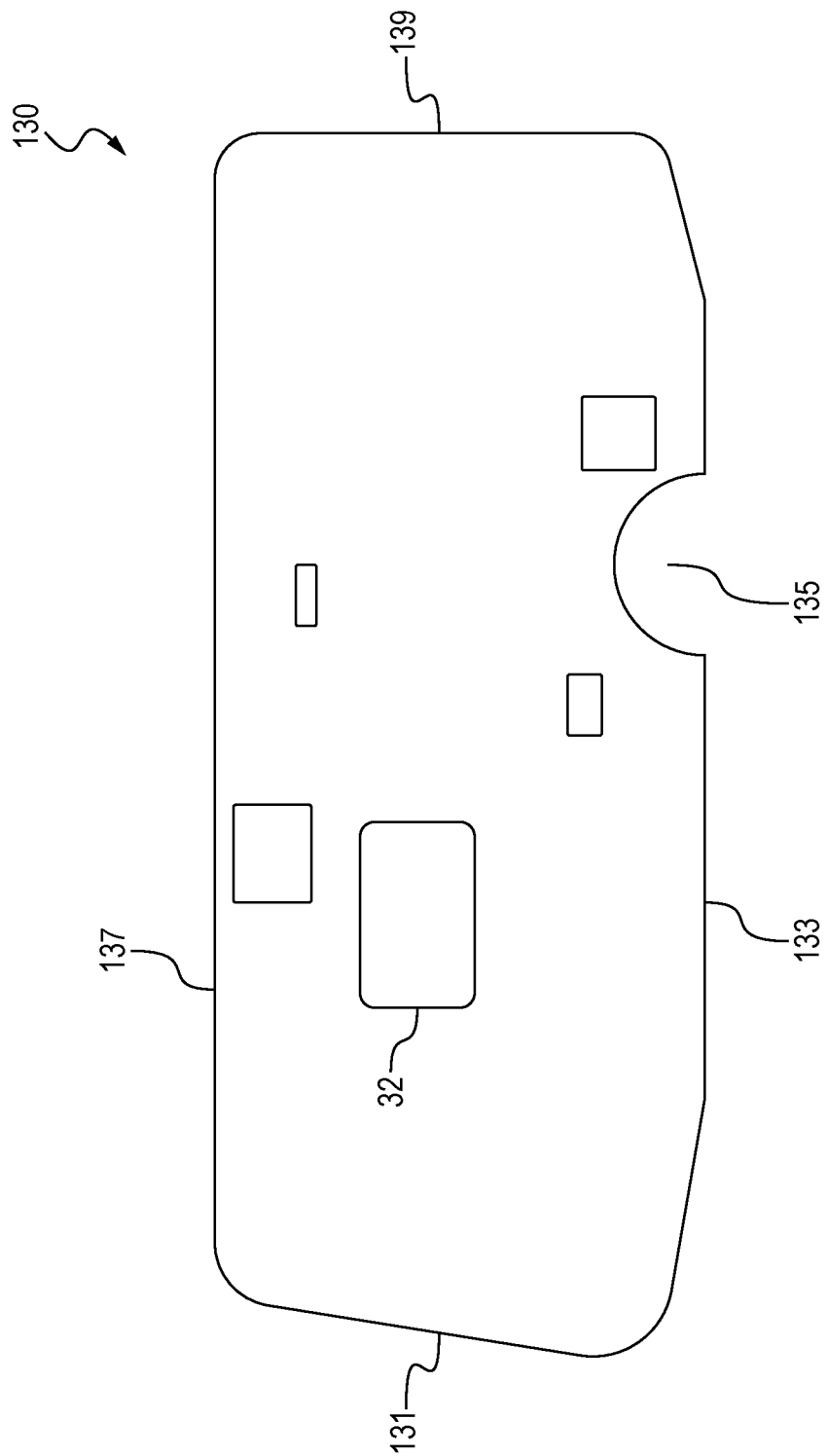
FIG. 3 is a plan view of a third continuous sheet of material used in forming the envelope for the over-the-road vehicle. The third continuous sheet of material forms a left side (or port) panel. Illustrative cutouts for windows and a wheel are visible along the left side panel as well.

FIG. 3 is a plan view of a third continuous sheet of material 130 used in forming the envelope 800 of FIG. 8. This third continuous sheet of material 130 also represents a planar material but is used in forming a left side (or port side) panel for the over-the-road vehicle.

In the view of FIG. 3, the third continuous sheet of material 130 is laid out as a single planar sheet. The third continuous sheet of material 130 includes a front end 131 and an opposing rear end 139. Also shown is a lower side 133 and an upper side 137.

The third continuous sheet of material 130 will have the same general dimensions as the second continuous sheet of material 120. The third continuous sheet of material 130 includes at least one opening 32 for accommodating a window, and an opening 135 for accommodating at least one left wheel. It is understood that the number and arrangement of such openings is a matter of designer's choice. In some embodiments, the opening 135 for accommodating at least one left wheel may be of such a size and arrangement to accommodate a second wheel in the case of a tandem-axle chassis configuration or in the case of a dual rear wheel configuration. The third continuous sheet of material 130 is intended to be sealingly secured to the left side 113 of the first continuous sheet of material 110 in forming the envelope 800.

The material used for each of the first continuous sheet of material 110, the second continuous sheet of material 120, and the third continuous sheet of material 130 is preferably the same.

Figure 4:
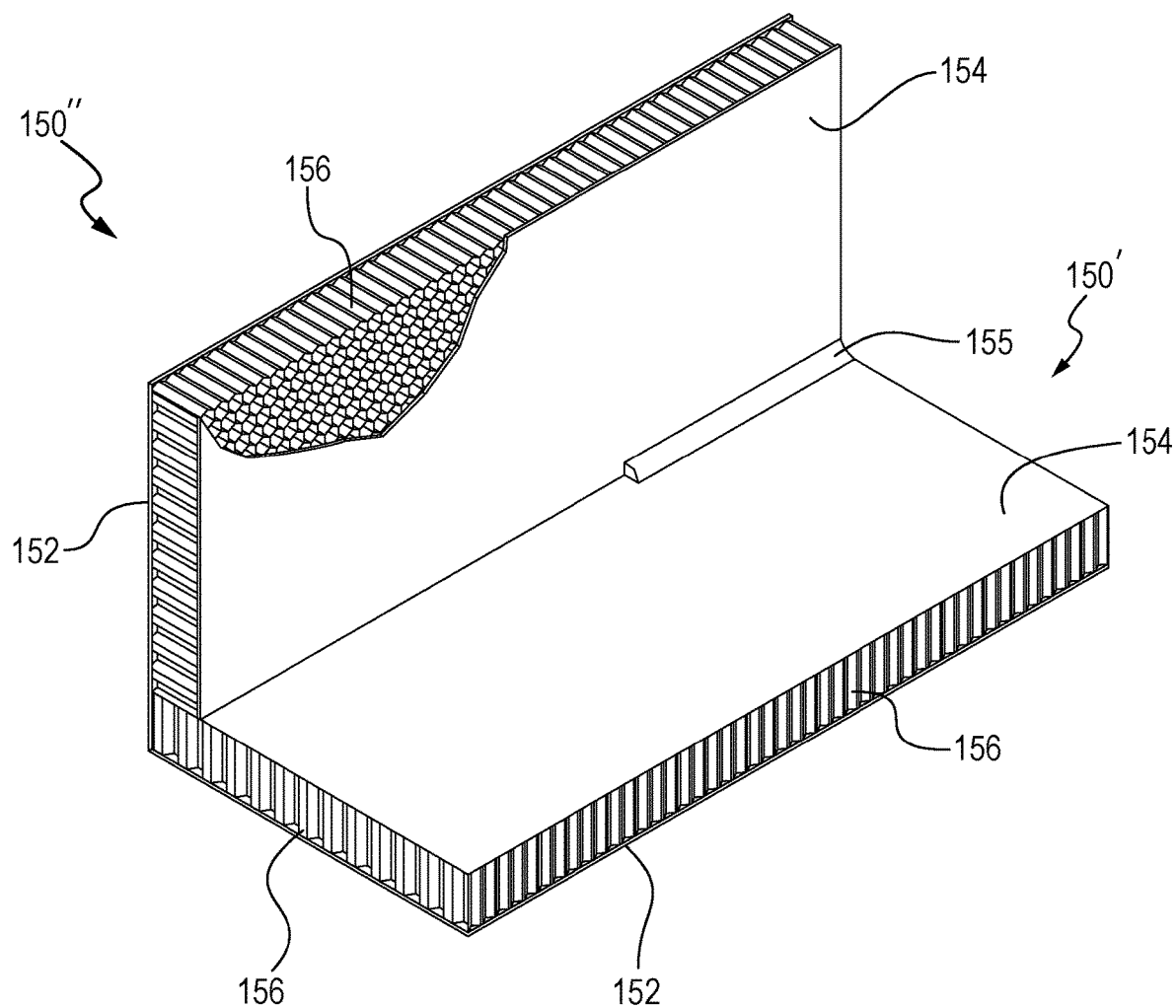
FIG. 4 is a cross-sectional view of two pieces of envelope material as may be used in forming the first, second, and third continuous sheets of material from FIGS. 1, 2, and 3, respectively.

FIG. 4 is a cross-sectional view of two adjoining pieces of envelope material 150. These are indicated separately as 150' and 150". The envelope material 150 as may be used in forming the first continuous sheet of material 110, the second continuous sheet of material 120, and the third continuous sheet of material 130 from FIGS. 1, 2, and 3, respectively. In a preferred arrangement, the envelope material 150 comprises a first side 152, and an opposing second side 154. Intermediate the first 152 and second 154 sides is a core 156. In this illustration of FIG. 4, a quarter-round 155 has been placed at the intersection of the two pieces of envelope material 150', 150".

Each of the first 152 and second 154 sides represents a skin fabricated from fiberglass. Each skin may be, for example, 0.015 inches to 0.10 inches in thickness, and more preferably about 0.05 inches in thickness. At the same time, the core 156 represents a structural thermoplastic material laid out in a honeycomb pattern. It is understood that the core 156 may be oriented in other patterns suitable for providing structure, flexibility, and rigidity. Each skin 152, 156 is laminated onto the core 156, forming something of a thermoresistant plastic resin. Preferably, the first layer 152 (or outside layer) is polished fiberglass, while the second layer 154 (or inside lawyer) is textured fiberglass.

The pieces of envelope material 150', 150" may be referred to as a type of "holey board." Holey board is a generic term that describes any planar material having a pattern of holes. The holes decrease weight of the material while increasing stability and shear strength. In the present case, the core material 156 has a honeycomb pattern invoking the term holey board.

The core material 156 may be any type of thermoplastic resin, so long as it is capable of being deformed without cracking or breaking. Examples include polytetrafluoroethylene ("PTFE"), polyetheretherketone ("PEEK"), polyetherimide (PEI), polyester and polystyrene. The core material 156 is heat resistant up to and exceeding 300° F. without any negative effect on mechanical properties. In addition to heat resistance, the core material 156 may demonstrate chemical resistance, corrosion resistance, and electrical resistivity. The core material 156 is light in weight but capable of serving as a durable, dent-resistant envelope for a vehicle body, or envelope.

The envelope material 150 (the core material 156 with the opposing sides 152, 154) is capable of precision bending. At the same time, the material 150 offers structural strength without a need for framing. The envelope material 150 is malleable and provides thermal insulation, mold and mildew resistance, and weather resistance. In addition, the envelope material 150 provides acoustic muffling while being durable and fire retardant. Further, the envelope material 150 resists UV rays, direct sun light, scratches, and bumps. In one aspect, the envelope material 150 is capable of withstanding compression loads up to 2.5 N/mm$^2$ (362.5 psi).

Figure 5:
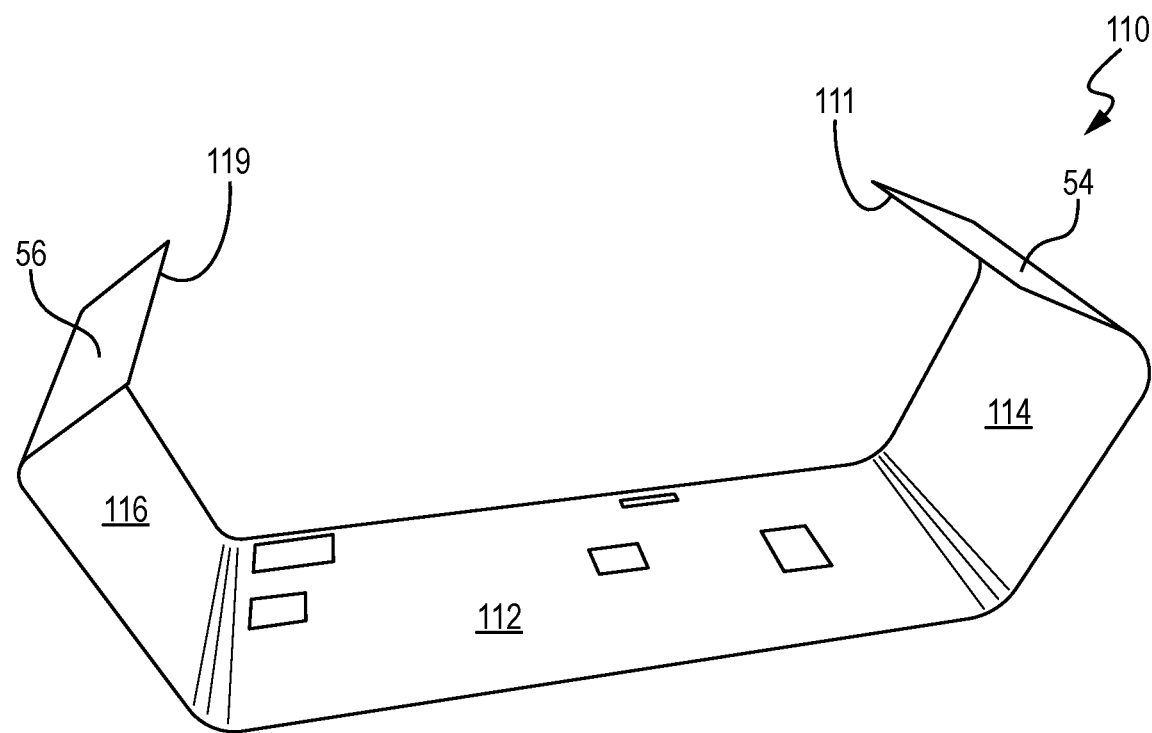
FIG. 5 is a perspective view of the first sheet of continuous material from FIG. 1. Here, the material is being folded over at opposing ends.

FIG. 5 is a perspective view of the first sheet of continuous material 110 from FIG. 1. Here, the first sheet of continuous material 110 is being folded over at the serrations 115. In this way, opposing ends 111, 119 are now moving towards each other. The first sheet of continuous material 110 now comprises a front panel 114, a rear panel 116, and an overhead panel 112 there between. In addition, the first continuous sheet of material 110 includes front 54 and rear 56 portions of a lower panel, all of which are used in forming the envelope 800.

It is understood that the serrations 115 define areas of weakness along the length of the first continuous sheet of material 110. The serrations 115 may be linear portions where the core 156 is thinned to facilitate folding. A plurality of such linear portions may be placed in parallel, presenting linear clusters. Preferably, the linear portions comprise grooves formed at least partially into the envelope material.

In addition to a front panel 114, a rear panel 116, an overhead panel 112, and portions 54, 56 of a lower panel, the envelope 800 will include a floor panel.

Figure 6:
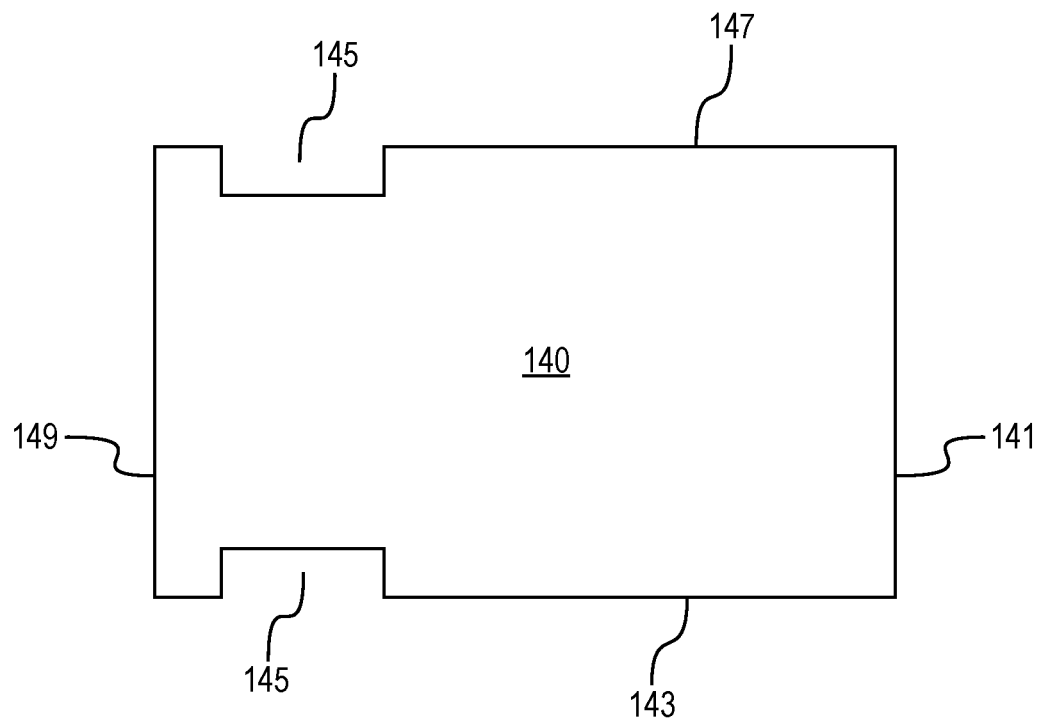
FIG. 6 is a plan view of a fourth continuous sheet of material as may be used in forming the envelope for the over-the-road vehicle. The fourth continuous sheet represents a portion of the floor panel. The floor panel straddles the opposing ends of the first continuous sheet of material shown in FIG. 5.

FIG. 6 is a plan view of a fourth continuous sheet of material 140 as may be used in forming the floor panel for the envelope 800 of FIG. 8. The fourth continuous sheet of material 140 has a front end 141 and an opposing rear end 149. In addition, the fourth continuous sheet of material 140 has a right side 143 and a left side 147. The floor panel (as represented by the fourth continuous sheet of material 140) may be between 12 feet and 20 feet in length, and between 6 feet and 10 feet in width.

Figure 7A:
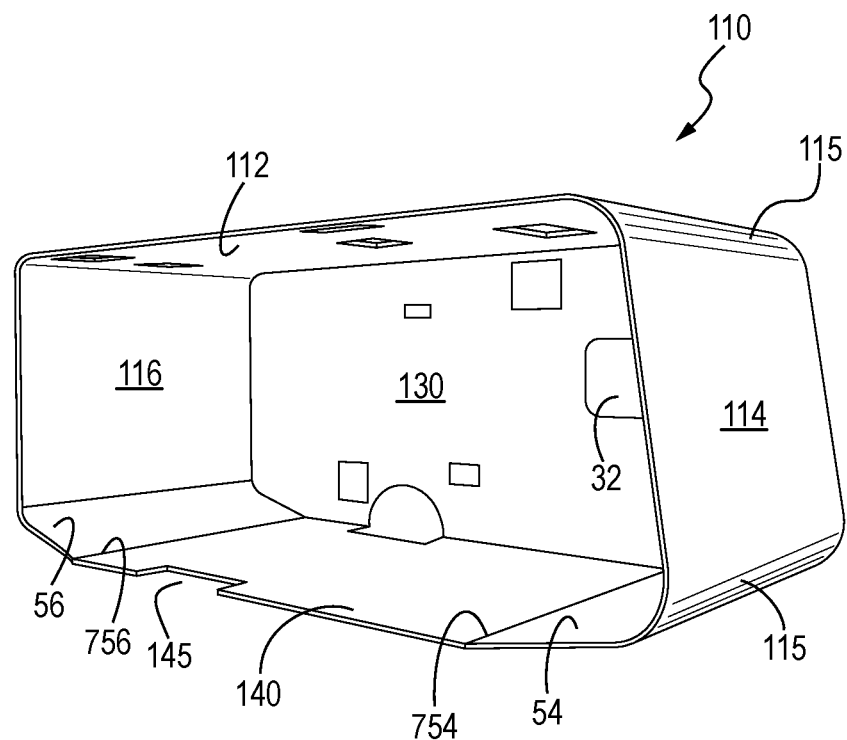
FIG. 7A is a perspective view of the first, third, and fourth continuous sheets of material from FIGS. 1, 3, and 6, respectively. The first, third, and fourth continuous sheets of material have been sealingly connected.

FIG. 7A is a perspective view of the first continuous sheet of material 110, the third continuous sheet of material 130, and the fourth continuous sheet of material 140 from FIGS. 1, 3, and 6 respectively. Here, the first continuous sheet of material 110 has been folded over to form the front panel 114, the rear panel 116, and the overhead panel 112. In addition, the front 54 and rear 56 portions of a lower panel are formed, all of which are used in forming the envelope 800.

FIG. 7A also shows the third continuous sheet of material 130. In this view, the third sheet 130 has been secured onto the left side 113 of the first continuous sheet of material 110, forming a left side panel. This may be done, for example, by thermoplastically welding the third continuous sheet of material 130 onto the first continuous sheet of material 110. Quarter-round 155 may be placed within the interior of the envelope being formed as desired.

Referring back to FIG. 4, an end of the second envelope material 150" is placed onto an end of the first envelope material 150'. The sheets of envelope material 150', 150" may be sealingly connected by a bead of thermoplastic material. The bead of thermoplastic material may be placed through the use of a professional hot air gun. Suitable thermoplastic materials may include polypropylene, polyethylene, and polyvinylchloride. Thermoplastic welding creates a permanent, durable molecular bond between the envelope materials 150', 150".

Now referring again to FIG. 7A, it is shown that the fourth continuous sheet of material 140 has been secured onto the opposing front 54 and rear 56 portions of the first continuous sheet of material 110. This may be done, for example, by placing shims under or over the points where the first continuous sheet of material 110 and the fourth continuous sheet of material 140 meet.

Figure 7B:
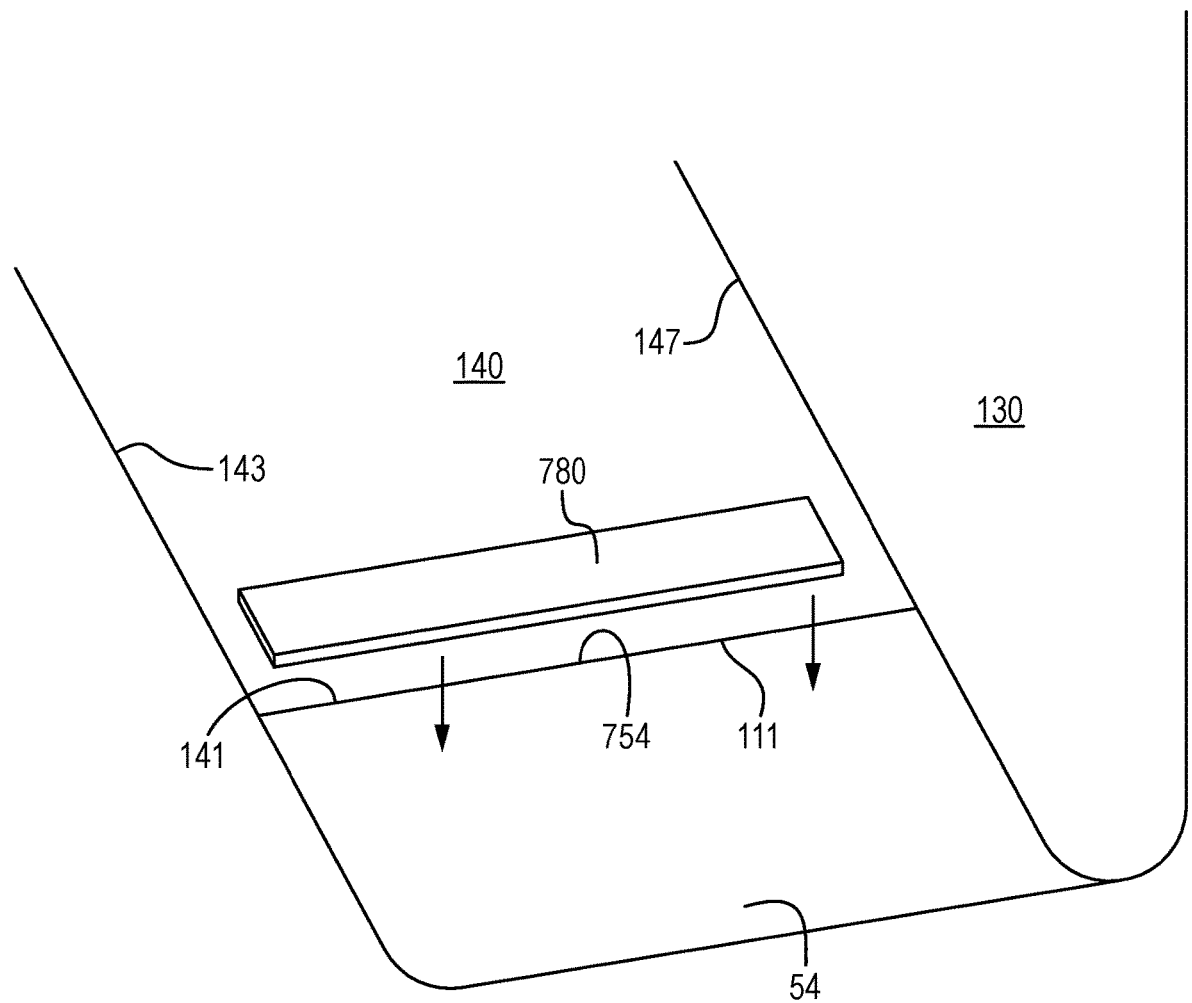
FIG. 7B is an enlarged view of the abutment where the front end of the fourth continuous sheet of material meets the front end of the first continuous sheet of material. A shim is seen in exploded apart relation over the abutment.

FIG. 7B is an enlarged view of the abutment 754 where the front end 141 of the fourth continuous sheet of material 140 meets the front end 111 of the first continuous sheet of material 110. A shim 780 is seen in exploded apart relation over the abutment 754.

It is understood that a second shim (not shown) may be placed under the abutment 754. In that case, the shim would reside between the envelope 800 and the chassis 900. Separate shims 780 may be placed both above and below the abutment 754. Similarly, a shim 780 may be placed above or below the abutment (seen at 756 in FIG. 7A) where the rear end 149 of the fourth continuous sheet of material 140 meets the rear end 119 of the first continuous sheet of material 110.

In any arrangement, each of the shims 780 is preferably fabricated from stainless steel. Each shim 780 may be, for example, a 4 inch by 80 inch thin metal band. In one aspect, two shims are applied to abutments 754, 756 of the first continuous sheet of material 110 and the fourth continuous sheet of material 140. Preferably, one shim is provided below each the abutments 754, 756, and one above each of the abutments 754, 756. Thus, four shims 780 are necessarily employed. The shims 780 may be mechanically connected to the first continuous sheet of material 110 and the fourth continuous sheet of material 140 at the abutments 754, 756. Means for mechanically connecting the shims may include rivets, clamps, bolts and nuts, and screws.

FIG. 8 is a three-dimensional model of the first continuous sheet of material 110, the second continuous sheet of material 120, the third continuous sheet of material 130, and the fourth continuous sheet of material 140 from FIGS. 1, 2, 3, and 6, respectively. The respective continuous sheets of material 110, 120, 130, and 140 have been connected together through thermoplastic welding, forming a complete envelope 800. The complete envelope 800 is formed through a series of manufacturing steps.

First, a section of envelope material 150 is obtained having dimensions sufficient to form the first continuous sheet of material 110. Openings 12, 14, 16, 18, and 20 are formed in the first continuous sheet of material 110 according to designer's choice. Thereafter, the first continuous sheet of material 110 is folded over along grooves or serrations 115 generally in accordance with the three-dimensional shape shown in FIG. 5. Grooves 115 are provided wherever bends (or folds) are needed.

In one aspect, the first continuous sheet of material 110 comprises precisely spaced parallel grooves 115 that are ¾ of an inch deep. The precisely spaced parallel grooves 115 are spaced apart in accordance with a desired bend radius. The closer the precisely spaced parallel grooves 115, the tighter the bending radius. Conversely, the further the precisely spaced parallel grooves 115, the larger the bending radius. For example, the following spaces may be formed:

| | |
|---|---|
| 1.147" | 18 grooves for a bend radius of 14³⁄₁₆ inches; |
| 1.125" | 17 grooves for a bend radius of 13 inches; |
| 0.706" | 18 grooves for a bend radius of 7⅞ inches; and |
| 0.563" | 17 grooves for a bend radius of 6⅞ inches. |

It is noted that in this bending or forming step, the relative lengths of the front 54 and rear 56 portions of the first continuous sheet of material 110 may be adjusted.

Next, a section of envelope material 150 is obtained having dimensions sufficient to form the second continuous sheet of material 120. Openings 125 are formed in the second continuous sheet of material 120 to accommodate wheel fenders. In addition, openings such as shown at 22, 24, 26, 28, 122, and 125 are formed in the second continuous sheet of material 120. The second continuous sheet of material 120 is cut to form the profile shown in FIG. 2, or more specifically, the profile of the right side 117 of the first continuous sheet of material 110. Thereafter, the second continuous sheet of material 120 is thermoplastically welded onto the right side 117 of the first continuous sheet of material 110.

Next, a section of envelope material 150 is obtained having dimensions sufficient to form the third continuous sheet of material 120. Openings 135 are formed in the third continuous sheet of material 130 to accommodate wheel fenders 135. Openings, e.g., 32 are also formed in the third continuous sheet of material 130 to accommodate windows and vents. The third continuous sheet of material 130 is cut to form the profile shown in FIG. 3, or more specifically, the profile of the left side 113 of the first continuous sheet of material 110. Thereafter, the third continuous sheet of material 130 is thermoplastically welded onto the left side 113 of the first continuous sheet of material 110.

The steps of thermoplastic welding will include the use of a soldering rod and a heavy-duty, professional grade hot-air soldering gun. The welding points produce an air- and liquid-tight interface. Optionally, additional caulking may be done along the weld points to provide additional air and liquid sealing of the weld points. Optionally, quarter-round 155 may be placed interior to the envelope 800 for aesthetic purposes.

Next, a section of envelope material 150 is obtained having dimensions sufficient to form the fourth continuous sheet of material 140. Openings 145 are formed in the fourth continuous sheet of material 140 to accommodate wheels. Thereafter, the fourth continuous sheet of material 140 is secured to the leading 111 and trailing 119 edges of the first continuous sheet of material 110.

In one aspect, securing the fourth continuous sheet of material at a first end to the leading edge 111 of the floor panel and at a second end to the trailing edge 119 of the floor panel, comprises:

- abutting the first end 141 of the fourth continuous sheet of material 140 against the leading edge 111 of the front portion of the floor panel 54, forming a first abutment 754;
- abutting the second end 149 of the fourth continuous sheet of material 140 against the trailing edge 119 of the rear portion of the floor panel 56, forming a second abutment 756;
- placing a first shim under the first abutment 754;
- securing the first end 141 of the fourth continuous sheet of material 140 and the leading edge of the floor panel 111 to the first shim;
- placing a second shim under the second abutment 756; and
- securing the second end 149 of the fourth continuous sheet of material 140 and the trailing edge of the floor panel 119 to the second shim.

The front portion 54 and the rear portion 56 are preferably each about six feet to nine feet in length. The securing steps for the leading edge 111 and trailing edge 119 to the shims 780 may optionally be done through the use of an adhesive, and optionally further through the use of bolts, rivets, clamps or metal screws.

It is observed that the above steps described for forming the envelope 800 need not necessarily be taken in the order described above. For example, the process of completing the floor panel (portions 54, 56, and the fourth continuous sheet of material 140) may be done either before or after the second continuous sheet of material 120 and the third continuous sheet of material 130 are thermoplastically welded to the first continuous sheet of material 110. Preferably, the envelope 800 is completed before being bolted onto the top of the chassis 900, but this is not required.

In addition, it is observed that the profiles, or geometric shapes, of the first continuous sheet of material 110 and the second 120, third 130 and fourth 140 continuous sheets of material may be modified to meet designer's choice or customer's specifications.

Figure 9A:
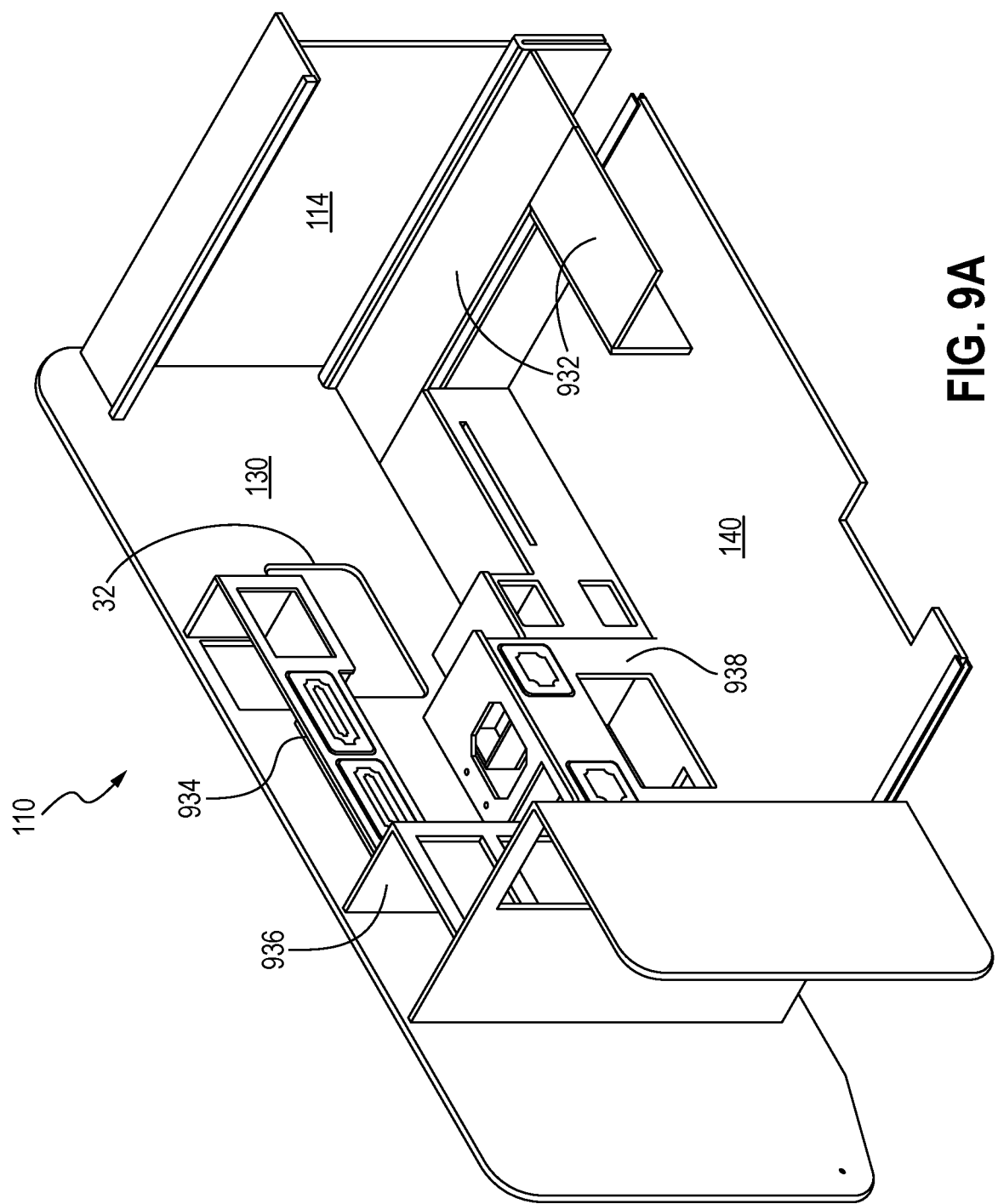
FIG. 9A is a perspective view of the third and fourth continuous sheets of material from FIGS. 3 and 6, respectively. In this view, an interior of the envelope is provided. The interior houses residential fittings such as appliances, electrical and plumbing connections, and cabinetry.

FIG. 9A is a perspective view of the third continuous sheet of material 130 and the fourth continuous sheet of material 140. In addition, the front end panel 114 of the first continuous sheet of material 110 is shown. In this view, an interior of the envelope 800 is visible. Various residential fittings have been installed, particularly cabinetry and benches.

Benches are shown at 932. In addition, cabinetry 934 is provided for cups, dishes and a microwave oven (not shown). Cabinetry 936 serves as a pantry while cabinetry 938 supports an oven, a range, and a sink (not shown). Additional residential fittings (not specifically shown) may include electrical and plumbing connections as well as fresh and grey water tanks. A number and arrangement of such residential fittings is a matter of designer's choice.

The cabinetry within the interior of the envelope 800 may be constructed of the envelope material 150 as described above in connection with FIG. 4. The cabinetry may also be oriented in such a way as to provide rigidity and structural support to the envelope itself 800. For example, the cabinetry may be secured to at least the first continuous sheet of material, the floor panel and to the overhead panel to provide structural stability to the envelope. This may be done by welding all (or most all) of the cabinetry together, and then welding top, bottom, and outer edges of the cabinetry to the outer welded envelope, or box. This process substantially increases the strength of the trailer.

In one aspect, by thermoplastic welding each piece of interior cabinetry to the next and then welding all the cabinetry to the interior walls, floor, and ceiling, a strong uni-body structure that can hold substantial weight and strength from fatigue is provided. This may be referred to as a uni-weld.

Additionally, the benches may be oriented to provide a housing for control equipment or personal affects.

Figure 9B:
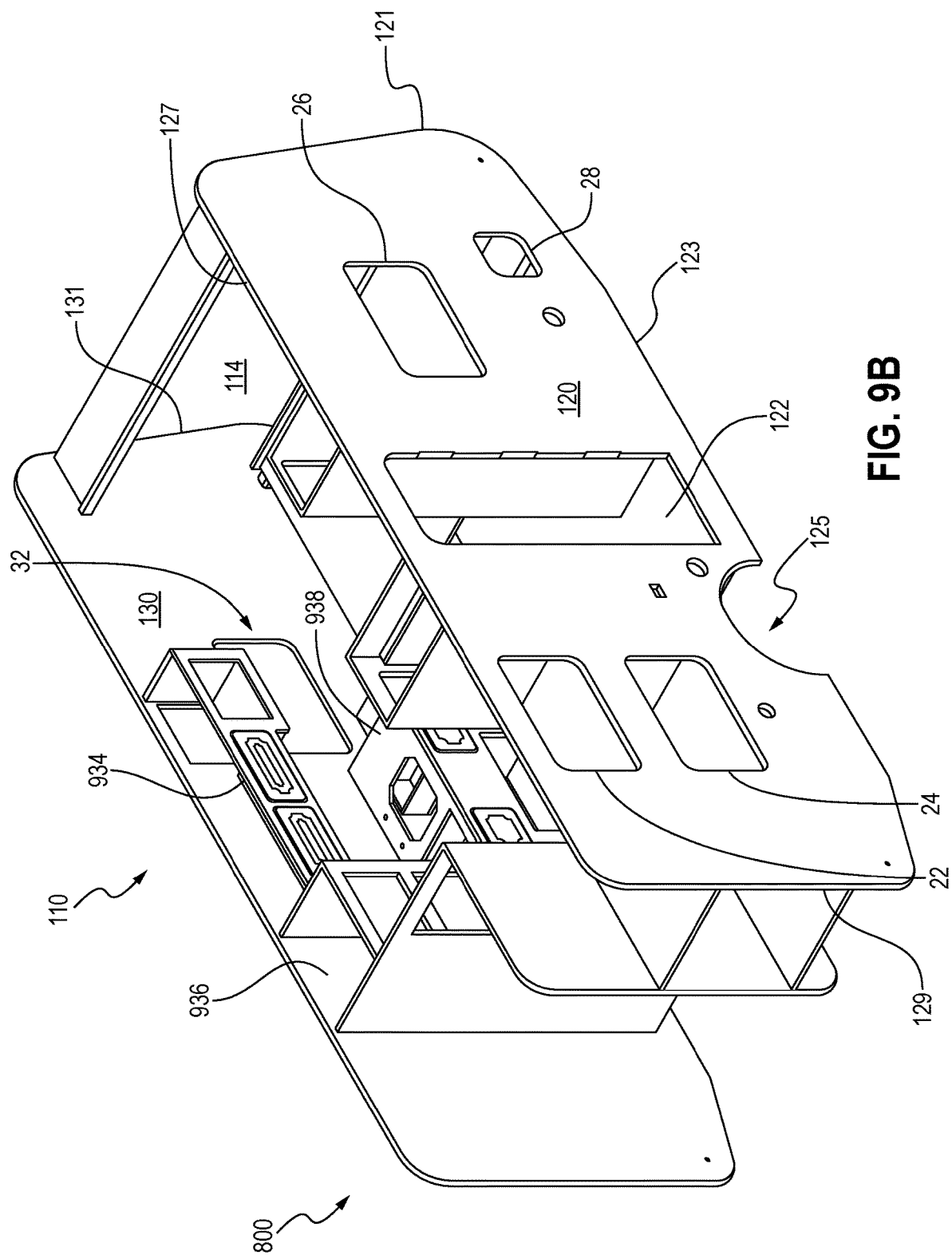
FIG. 9B is a perspective view of the second, third, and fourth continuous sheets of material from FIGS. 2, 3, and 6, respectively. In this view, interior cabinetry has been added to the envelope.

FIG. 9B is a perspective view of the second continuous sheet of material 120 and third continuous sheet of material 130 of the envelope 800. In addition, the front end panel 114 of the first continuous sheet of material 110 is shown. It is understood that the fourth continuous sheet of material 140 is also present, though not visible. The interior of the envelope again includes residential fittings similar to those shown in FIG. 9A.

Each wall, closet, and cabinet frame that is welded inside the envelope 800 is used to maintain a strong uni-body design which allows little or no box movement. The walls and cabinetry are welded together, such as through thermoplastic welding, to provide strength and longevity. Stated another way, by thermoplastic welding each piece of interior cabinetry to the next and then welding all the cabinetry to the interior walls, floor, and ceiling, a strong uni-body structure is created that can hold substantial weight and strength from fatigue. In one aspect, the roof (panel 112) is capable of supporting over 3,000 lb.

FIG. 10 is a perspective view of the chassis 900 as may be used to support the envelope 800 of FIG. 8. The chassis 900 is constructed from a frame material 910. The frame material 910 may be aluminum, steel, or other suitable material. Further, the frame material 910 may be configured in a boxed construction, I-beam construction, or C-channel construction. Preferably, the chassis 900 is a single-axle 920 trailer having two wheels 925. In other embodiments, the chassis 900 may include a tandem-axle construction having four wheels, wherein in each axle has a left wheel and a right wheel. Further, in an alternate embodiment, the chassis 900 may comprise of a dual wheel configuration, wherein an axle 920 has two left wheels and two right wheels. The chassis 900 will also include a trailer hitch 930, suitable to be pulled by a lightweight truck (not shown).

Figure 11A:
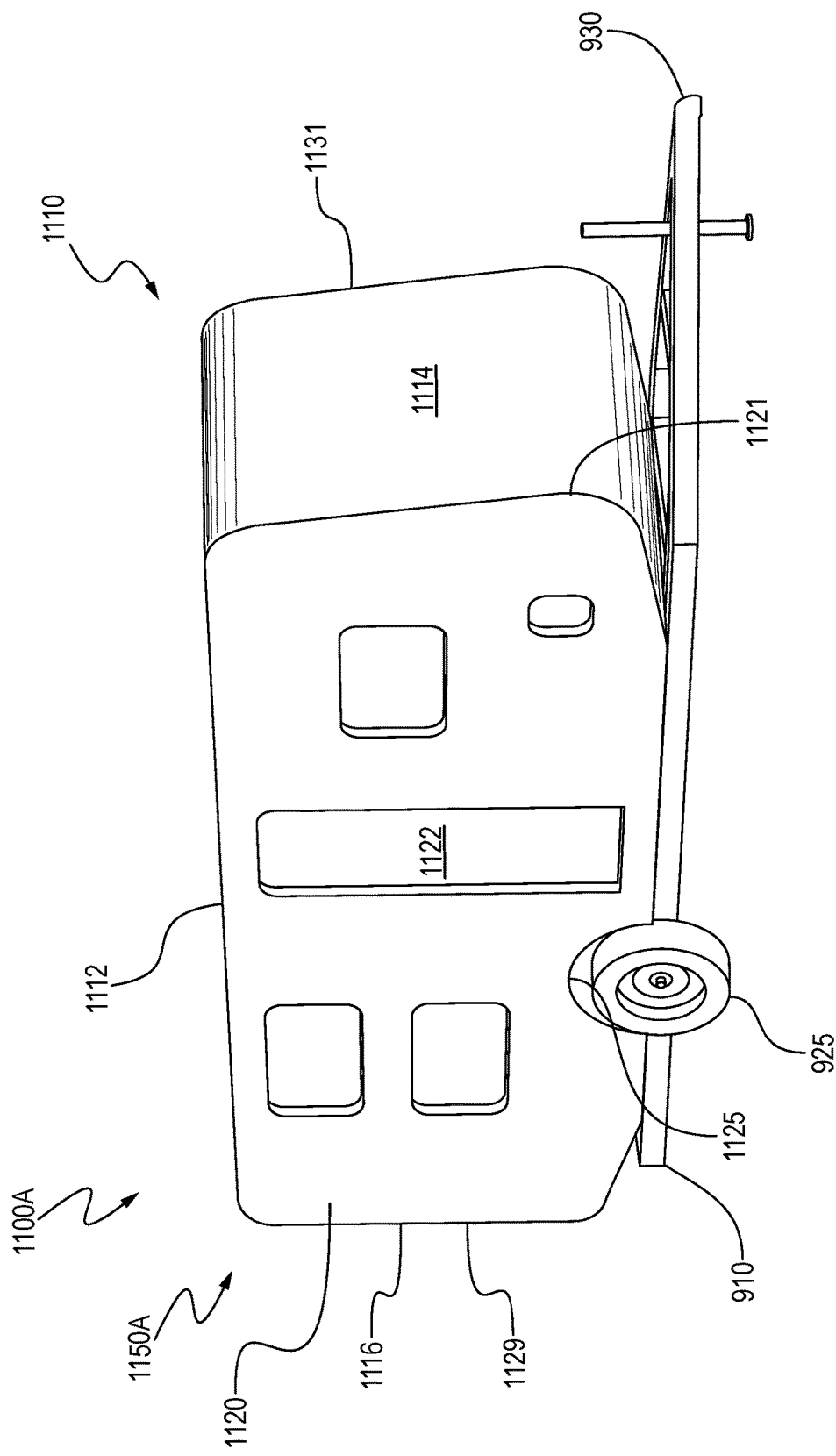
FIG. 11A is another perspective view of the envelope of FIG. 8. Here, the envelope has been secured onto the chassis of FIG. 10. An over-the-road vehicle is thus formed.

FIG. 11A a perspective view of an over-the-road vehicle 1100A in a first alternate embodiment. In this embodiment, the over-the-road vehicle 1100A comprises a box trailer 1150A. The box trailer 1150A, in turn, has been affixed onto the frame 910 of a chassis, such as chassis 900 of FIG. 9.

The box trailer 1150A has been fabricated in accordance with the envelope material 150 described above. In this respect, the material comprises a first side surface 152 and a second side surface 154. These are referred to above as "skins," with each side surface being fabricated from fiberglass. Each skin may be, for example, 0.015 inches to 0.10 inches in thickness, and more preferably about 0.05 inches in thickness. Intermediate each side surface 152, 154 is a so-called core 156. The core 156 represents a structural thermoplastic material laid out in a honeycomb pattern. Each side surface 152, 156, or skin, is laminated onto the core 156, forming a holey board that may be molded into a three-dimensional shell for the off-the-road vehicle 1000. Preferably, the first layer 152 (or outside layer) is polished fiberglass, while the second layer 154 (or inside lawyer) is textured fiberglass.

The envelope material of the box trailer 1150A is formed by thermoplastically welding panels of the envelope material 150 at their conjoined edges. The panels represent a first continuous sheet of material, a second continuous sheet of material, and a third continuous sheet of material.

In the view of FIG. 11A, portions of the first continuous sheet of material are visible. These represent an overhead panel 1112 and a front panel 1114. It is understood that the first continuous sheet of material will also include a rear panel and at least a portion of a lower panel (such as is demonstrated in FIGS. 1 and 5).

In FIG. 11A, the second continuous sheet of material 1120 is visible. The second continuous sheet of material 1120 serves as the starboard panel of the box trailer 1150. It can be seen that the starboard panel 1120 includes a front end 1121 and a rear end 1116. A door 1122 is optionally provided in the starboard panel 1120. A cut-out 1125 is preserved for a tire 925.

In FIG. 11A, the third continuous sheet of material is not visible. However, it is understood that a port side of the box trailer 1150A will have the third continuous sheet of material. This will serve as a panel that will reside on the chassis 900 opposite the starboard panel of the box trailer 1150A. The unseen port panel will also have a front end and a rear end. A cut-out is also preserved for a tire on an axle opposite of tire 925.

In FIG. 11A, the floor panel also is not visible. However, it is understood that a floor panel is also provided as part of the box trailer 1150. The floor panel may be in accordance with the floor panel shown as the fourth continuous sheet of material 140 in FIG. 4. The floor panel is secured to the frame 910 of the trailer 900 such as through the use of bolts (not shown). The end panels (shown at 54 and 56 of FIG. 5) are then secured to the floor panel, such as through the use of shims (seen at 780 in FIG. 7B).

The various panels described herein form an envelope for the box-trailer 1150. In forming the envelope, the first continuous sheet of material may include a plurality of sets of serrations 1115. The serrations 1115 may be in accordance with the serrations 115 of FIG. 1.

Figure 11B:
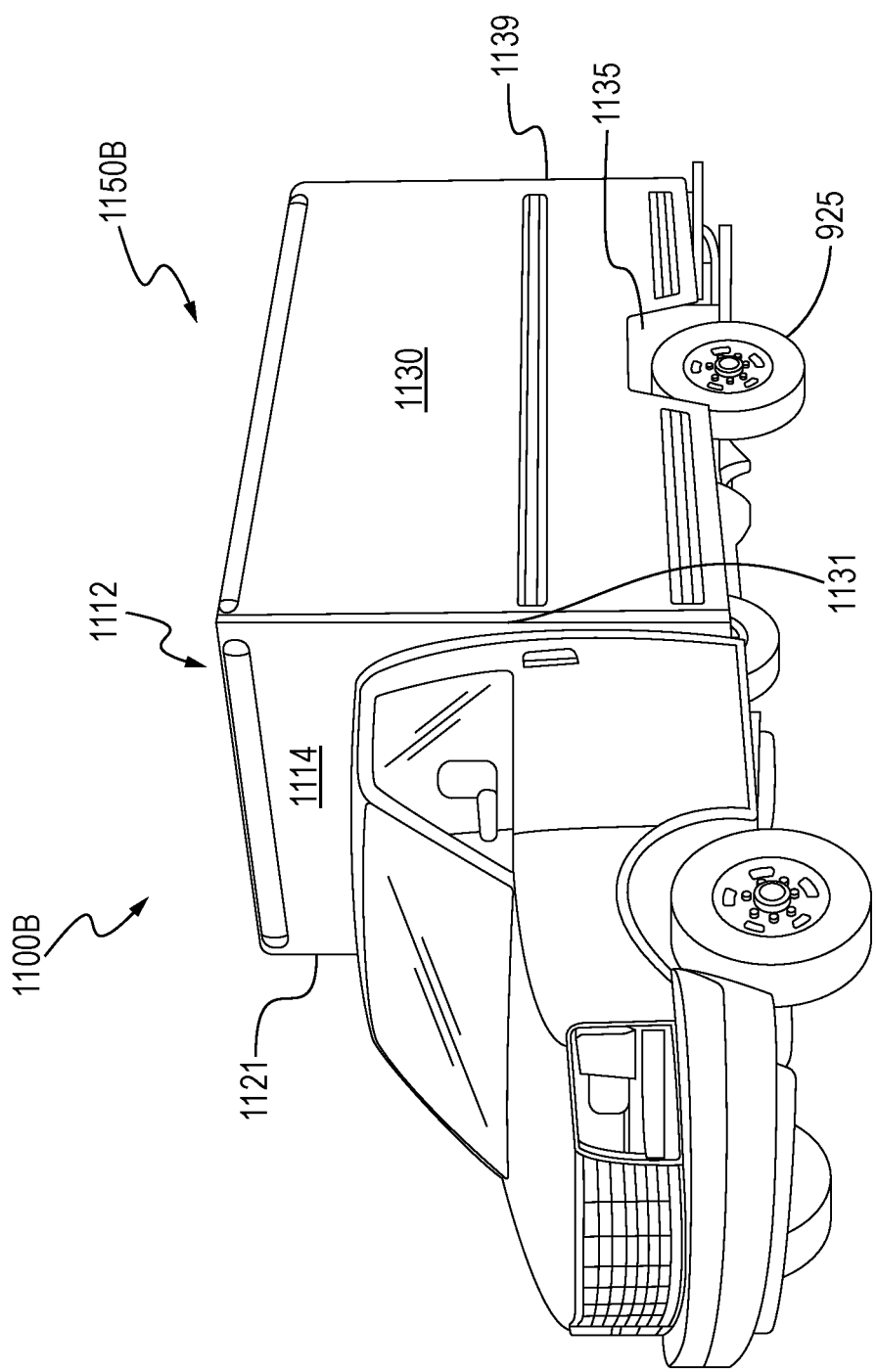
FIG. 11B a perspective view of an over-the-road vehicle of the present invention, in an alternative embodiment. In this embodiment, the over-the-road vehicle represents a box trailer as the envelope, sitting on a chassis having a single axle.

FIG. 11B is a perspective view of an over-the-road vehicle 1100B of the present invention, in a second alternative embodiment. In this embodiment, the over-the-road vehicle 1150B comprises an integrated box truck 1150B. The integrated box truck 1150B defines a cargo compartment that rides on a chassis. The chassis, in turn, is connected to a truck having a passenger compartment and an engine compartment.

The integrated box truck 1150B is comprised of a series of separate panels. These represent a front panel 1114, a rear panel (not visible), a top panel 1112, a starboard panel 1130 and a port panel (not visible). The starboard panel 1130 has a front end 1131 and a rear end 1139. A cut-out portion 1135 is provided to accommodate a tire 925. Likewise, the port panel has a front end 1121 and a rear end (not visible) as well as a cut-out portion to accommodate a tire (seen at 925 in FIG. 11A).

The five identified panels form an envelope for the cargo compartment 1150B. The panels are connected through thermoplastic welding using, for example, a hot air gun as described above. The five panels are secured onto a floor panel (not visible). The floor panel may be fabricated from wood planks or other heavier material suitable for supporting a heavy cargo load. In this arrangement, the front panel 1114, the port panel and the starboard panel 1130 may have lower portions having serrations (such as those shown at 1115 in FIG. 11A). The lower portions of these panels may be folded over onto the floor panel, and then secured to the floor panel such as through the use of shims and rivets.

In the arrangement of FIG. 11B, the panels (including the floor panel) form a six-sided compartment having a rectangular cross-section. It is understood that the rear panel (not shown) may have a very large cut-out to accommodate a rolling overhead door. The cargo compartment representing the integrated box trailer 1150B may also include energy storage devices such as batteries and capacitors to provide power for operating the overhead door, internal lights, and an optional rear power lift.

Each of the five listed panels above the floor panel is fabricated in accordance with the envelope material 150 described above in connection with FIGS. 1 and 4. This provides for a lightweight yet durable envelope for the cargo compartment 1150B.

It is understood that the present inventions are not limited by the style or arrangement of the chassis 900, so long as it is capable of supporting the envelope 800 or 1150A or 1150B and other features forming an over-the-road vehicle. Such other features may include a refrigeration unit, a potable water tank, a grey water tank, a wet toilet, a propane (or LPG) tank for cooking fuel, a radio, a television, and so forth. These additional features are neither shown nor claimed herein.

Figure 12A:
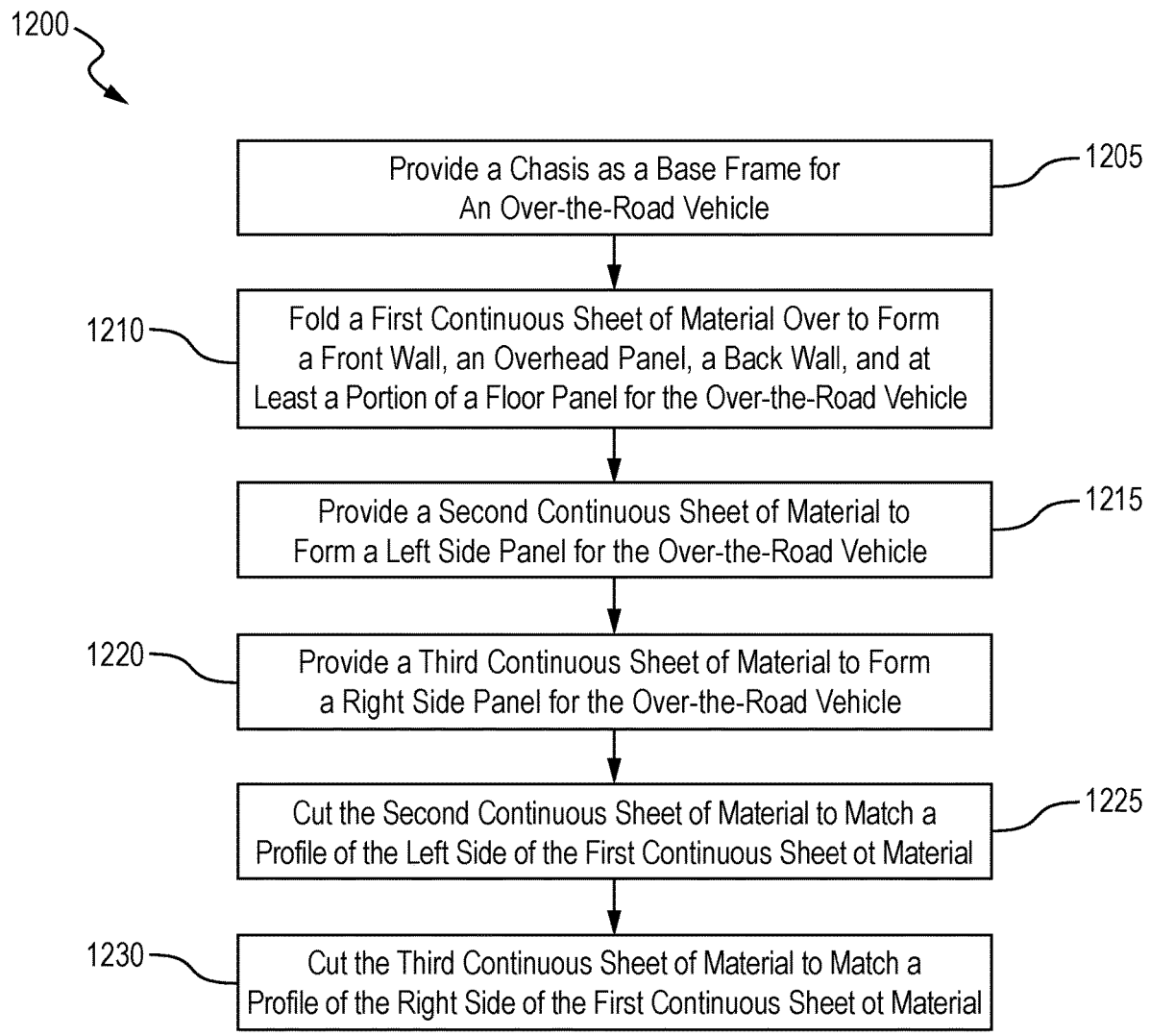
FIGS. 12A and 12B represent a single flow chart demonstrating steps used in forming an envelope for an over-the-road vehicle of the present invention, in one embodiment.
Figure 12B:
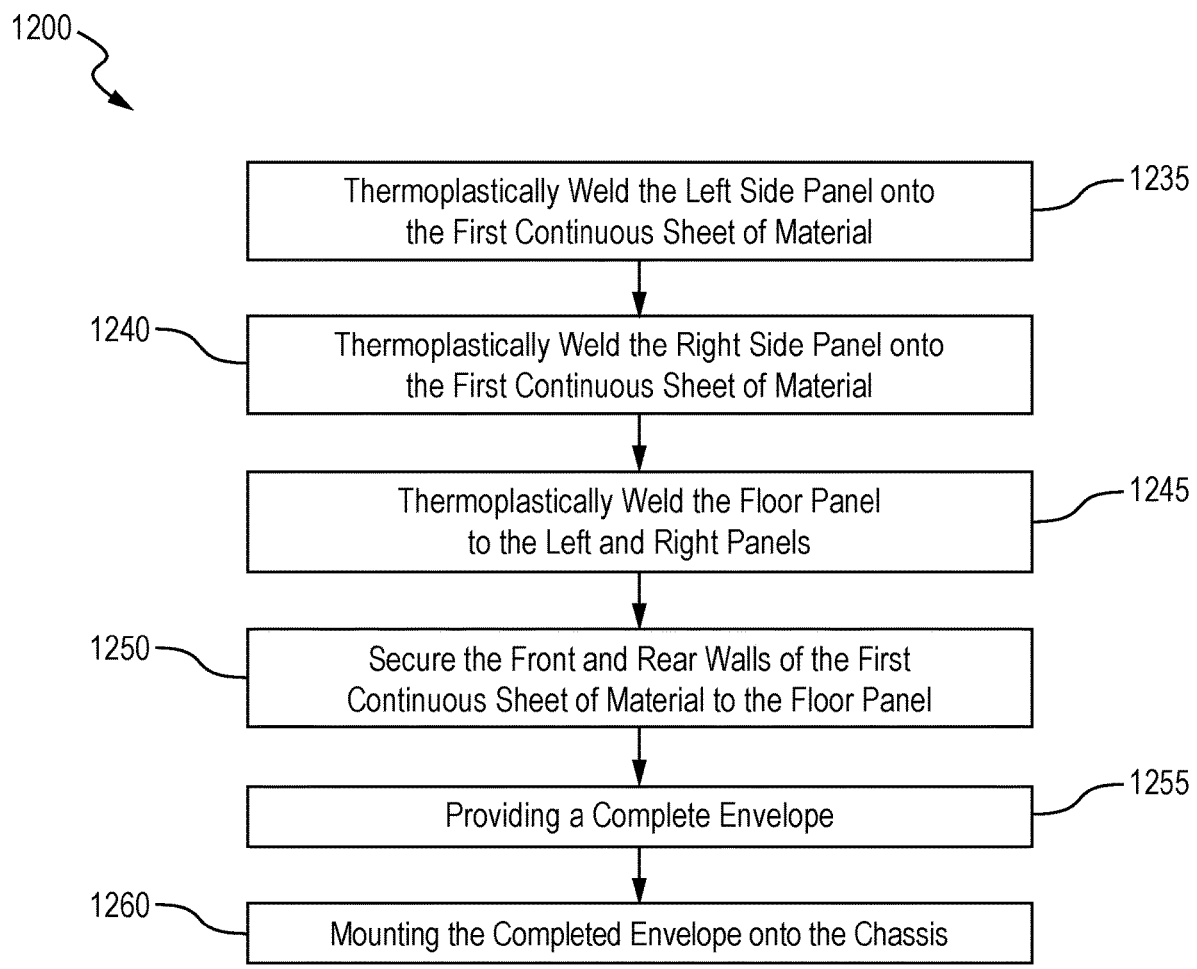

A method of fabricating an over-the-road vehicle is also provided herein. FIGS. 12A and 12B represent a unified flow chart demonstrating a method 1200 for forming an envelope for an over-the-road vehicle of the present invention, in one embodiment.

In one aspect, the method 1200 first comprises providing a chassis. This is shown in Box 1205. The chassis serves as a base frame for the over-the-road vehicle. The chassis may be a trailer in accordance with chassis 900 of FIG. 10. Alternatively, the chassis may be a part of a truck for supporting an integrated cargo compartment.

The method 1200 also includes providing an envelope. This is shown in Boxes 1210, 1215, 1220, 1225, 1230, 1235, 1240, 1245, and 1250. The envelope may be in accordance with the envelope 800 described above, in its various embodiments. In this respect, the envelope 800 may comprise:

a first continuous sheet of material 110 folded over to form a front wall 114, an overhead panel 112, a back wall 116, and at least a portion of a floor panel 54/56, as shown in Box 1210;

a second continuous sheet of material 120 forming a left side panel, as shown in Box 1215; and a third continuous sheet of material 130 forming a right side panel, as shown in Box 1220.

Each of the first, second, and third continuous sheets of material are fabricated from at least one fiberglass sheet. More preferably, the continuous sheets of material 110, 120, and 130 comprise first and second sheets of fiberglass material that are laminated onto opposing sides of a core. The core is a composite material. An example is a structural thermoplastic material oriented in a honeycomb configuration. In this way, a pliable, or malleable, material is formed.

A profile of the second continuous sheet of material is cut to match the profile of the left side of the first continuous sheet of material. This is shown in Box 1225. Preferably, the profile is cut after the first continuous sheet of material has been folded over, but this is the engineer's choice.

Similarly, a profile of the third continuous sheet of material is cut to match the profile of the right side of the first continuous sheet of material. This is shown in Box 1230. Preferably, the profile is cut after the first continuous sheet of material has been folded over, but again this is the engineer's choice.

The method 1200 further includes thermoplastically welding the left side panel onto the first continuous sheet of material on the left side of the envelope. This is shown in Box 1235. The method 1200 reciprocally includes thermoplastically welding the right side panel onto the first continuous sheet of material on the right side of the envelope. This is shown in Box 1240.

The method 1200 additionally comprises thermoplastically welding the floor panel to the left and right panels. This is shown in Box 1245.

The method 1200 further comprises securing the front and rear portions of the first continuous sheet of material to the floor panel. This is shown in Box 1250. The step of Box 1250 is preferably done by mechanically securing abutments of the front end and rear portions of the first continuous sheet of material with opposing ends of the floor panel. The two abutments may be secured using shims. The shims, in turn, secure the abutments either mechanically by means of bolts or rivets, or adhesively.

Preferably, the front and rear portions of the first continuous sheet of material together represent 20% to 40% of a length of a floor panel. For example, each of a leading edge and a trailing edge of the first continuous sheet of material forming the portion of the floor panel may be 4 feet to 6 feet in length. The envelope then further comprises a fourth continuous sheet of material forming a remaining 60% to 80% length of the floor panel.

Alternatively, the floor panel may be fabricated from planks of wood. In this instance, the front and rear portions of the first continuous sheet of material are mechanically secured to the wood planks and may only extend along 2% to 5% of a length of the floor panel.

At this point in the method 1200, the envelope is complete. This is shown in Box 1255. Lastly, the completed envelope is mounted onto the chassis 900. This is shown in Box 1260.

In one aspect, each of the first, second and third continuous sheets of material is comprised of:
- a first fiberglass sheet;
- a second fiberglass sheet; and
- a composite sheet residing between the first and second fiberglass sheets, with each of the first and second fiberglass sheets being bonded to the composite sheet to form a shell material.

As can be seen, a novel envelope (or housing) for an over-the-road vehicle is offered herein. Beneficially, the over-the-road vehicle housing does not need framing support in order to match or exceed the strength of existing, lightweight over-the-road vehicle products on the market.

In addition, unique methods for forming the envelope and for manufacturing an over-the-road vehicle are provided. Beneficially, the over-the-road vehicle housing may be formed by folding a single piece of bendable holey board material as a first two-dimensional sheet of material around a specific, pre-designed pattern, thereby forming:
- the leading edge of a floor panel;
- a front panel;
- an overhead panel;
- a back panel; and
- a trailing edge of the floor panel.

Thereafter, the following additional steps may be taken to create the over-the-road vehicle housing:
- procuring a second two-dimensional sheet of material;
- forming openings through the second two-dimensional material to serve as at least one window opening and a door opening;
- procuring a third two-dimensional sheet of material;
- thermoplastically welding the second two-dimensional sheet of material to a first side of the first continuous sheet of material;
- thermoplastically welding the third two-dimensional sheet of material to a second side of the first continuous sheet of material;
- procuring a fourth two-dimensional sheet of material;
- securing a first end of the fourth two-dimensional sheet of material to the leading edge of a floor panel, and at a second end to the trailing edge of the floor panel, thereby forming the over-the-road vehicle housing.

During the steps of thermoplastically welding, the first and second sides (e.g., left and right sides) of the over-the-road vehicle housing may engage with 1.2 inch cutouts made on the left and right sides of the first two-dimensional sheet of material. Uncut material on the first two-dimensional sheet of material lays over the left and right walls, assuring a uniform finish and weather tightness after thermoplastic welding on all inside and outside junctions.

In this way, the over-the-road vehicle housing is formed from only four continuous sheets of material, plus the shims at the two end joints, or abutments. The result is a stand-alone product. The over-the-road vehicle housing is then seated on a specially adapted chassis fitted with electric wiring (12V), plumbing, and tires. Three-inch bolts may be used to secure the over-the-road vehicle housing to the chassis. No additional flooring is required, as first continuous sheet of material and the fourth continuous sheet of material may comprise the floor panel of the over-the-road vehicle housing.

It is understood that the process of manufacturing a complete over-the-road vehicle will include numerous other steps. Once the over-the-road vehicle envelope (or housing) is completed and secured onto the chassis, inside cabinetry, plumbing, and electrical connections may be installed. A central electrical converter is also installed. Lights and electronic safety monitoring devices may also be installed along with decorative carpet. The decorative carpet may also serve as further insulation of the envelope.

Cabinetry, counter tops, beds, toilet, and shower are included in the installation. In order to complete the over-the-road vehicle, finishing activities may include installing cabinets, electrical systems, appliances, and a water closet. The over-the-road vehicle housing also receives exterior windows, doors, and an air ventilation unit. Cleaning, inspection, and functional and safety tests complete the production process. The over-the-road vehicle housing is light-weight. A light-weight configuration of the over-the-road vehicle housing allows the housing to be coupled to a vehicle, which may include a small, personal vehicle, truck, or electric vehicle. In other embodiments, the over-the-road vehicle housing may be mechanically coupled directly to the chassis of a larger vehicle to form a box truck.

Further, variations of the method of manufacturing an over-the-road vehicle may fall within the spirit of the claims below. It will be appreciated that methods of manufacturing are susceptible to modification, variation, and change without departing from the spirit thereof.

What is claimed is:

1. An over-the-road vehicle, comprising:
a chassis;
an envelope supported on the chassis, wherein the envelope is fabricated from:
a first continuous sheet of material folded over to form a front wall, an overhead panel, a back wall, and at least a portion of a floor panel;
a second continuous sheet of material forming a left side panel; and
a third continuous sheet of material forming a right side panel; wherein:
the left side panel is thermoplastically welded onto the first continuous sheet of material on a first side of the first continuous sheet of material;
the right side panel is thermoplastically welded onto the first continuous sheet of material on a second side of the first continuous sheet of material;
the envelope is secured onto the chassis; and
each of the first, second, and third continuous sheets of material is fabricated from at least one pliable fiberglass sheet.

2. The over-the-road vehicle of claim 1, wherein the chassis is a trailer.

3. The over-the-road vehicle of claim 2, wherein the envelope forms a shell for a recreational vehicle having residential fittings.

4. The over-the-road vehicle of claim 3, wherein each of the first, second, and third continuous sheets of material is comprised of:
a first fiberglass sheet;
a second fiberglass sheet; and
a composite sheet residing between the first and second fiberglass sheets and serving as a core, with each of the first and second fiberglass sheets being bonded to an opposing surface of the composite sheet to form the envelope.

5. The over-the-road vehicle of claim 4, further comprising:
a fourth continuous sheet of material also serving as a portion of the floor panel.

6. The over-the-road vehicle of claim 5, wherein:
the portion of the floor panel from the first continuous sheet of material represents a front portion and a rear portion, which together form 20% to 40% of a length of the floor panel; and
the fourth continuous sheet of material forms a remaining 60% to 80% of the length of the floor panel and resides between the front portion and the rear portion of the first continuous sheet of material, respectively.

7. The over-the-road vehicle of claim 5, wherein each of the first, second and third continuous sheets of material is between 0.5 inches and 2.0 inches in thickness.

8. The over-the-road vehicle of claim 7, wherein the composite sheet comprises a honeycomb pattern of plastic material and is between 0.5 inches and 2.0 inches in thickness.

9. The over-the-road vehicle of claim 2, wherein the envelope forms a box trailer.

10. The over-the-road vehicle of claim 9, wherein:
the envelope comprises cabinetry residing therein; and
the cabinetry is thermoplastically welded into place with the left side panel, the right side panel, or both, to provide structural strength to the envelope.

11. The over-the-road vehicle of claim 10, wherein:
the cabinetry and each of the first, second, and third continuous sheets of material is comprised of:
a first fiberglass sheet;
a second fiberglass sheet; and
a composite sheet residing between the first and second fiberglass sheets and serving as a core, with each of the first and second fiberglass sheets being bonded to an opposing surface of the composite sheet to form the envelope.

12. The over-the-road vehicle of claim 10, wherein at least some of the cabinetry is thermoplastically welded to the floor panel and to the overhead panel to form a structural uni-body.

13. The over-the-road vehicle of claim 9, further comprising wood planks residing between the trailer and at least the portion of the floor panel from the first continuous sheet of material.

14. The over-the-road vehicle of claim 2, wherein:
the chassis is a part of a two-axle truck; and
the envelope serves as a cargo compartment for the two-axle truck.

15. The over-the-road vehicle of claim 6, wherein:
the floor panel comprises (i) a front abutment where the fourth continuous sheet of material meets the front portion of the first continuous sheet of material, and (ii) a second abutment where the fourth continuous sheet of material meets the rear portion of the first continuous sheet of material;
and wherein the over-the-road vehicle further comprises:
at least one shim placed at the front abutment, overlapping the first continuous sheet of material and the fourth continuous sheet of material; and
at least one shim placed at the rear abutment, overlapping the first continuous sheet of material and the fourth continuous sheet of material.

16. The over-the-road vehicle of claim 15, wherein:
the at least one shim placed at the front abutment comprises one shim placed above the front abutment, and one shim placed below the front abutment; and
the at least one shim placed at the rear abutment comprises one shim placed above the rear abutment, and one shim placed below the rear abutment;
all to secure the first continuous sheet of material to the fourth continuous sheet of material to form the floor panel.

17. The over-the-road vehicle of claim 16, wherein the fourth continuous sheet of material is mechanically secured to the chassis using bolts, rivets, or combinations thereof.

18. The over-the-road vehicle of claim 16, wherein:
the shims at the front abutment are secured to the front portion of the first continuous sheet of material by means of an adhesive; and
the shims at the rear abutment are also secured to the rear portion of the first continuous sheet of material by means of an adhesive.

19. A method of fabricating an over-the-road vehicle, comprising:
providing a chassis;
providing an envelope, wherein the envelope comprises:
a first continuous sheet of material folded over to form a front wall, an overhead panel, a back wall, and at least a portion of a floor panel;
a second continuous sheet of material forming a left side panel; and
a third continuous sheet of material forming a right side panel;

sealingly connecting the left side panel to the first continuous sheet of material on a first side of the first continuous sheet of material;
sealingly connecting the right side panel onto the first continuous sheet of material on a second side of the first continuous sheet of material; and
securing the envelop onto the chassis;
and wherein each of the first, second, and third continuous sheets of material are fabricated from at least one pliable fiberglass sheet.

20. The method of claim 19, wherein the envelope further comprises:
a fourth continuous sheet of material also serving as a portion of the floor panel.

21. The method of claim 19, wherein the chassis is a trailer.

22. The method of claim 21, wherein the envelope forms a shell for a recreational vehicle having residential fittings.

23. The method of claim 22, wherein:
the envelope comprises cabinetry residing therein; and
the method further comprises thermoplastically welding the cabinetry into place within the envelope to the left side panel, the right side panel, or both, to provide structural strength to the envelope.

24. The method of claim 19, wherein each of the first, second, and third continuous sheets of material is comprised of:
a first fiberglass sheet;
a second fiberglass sheet; and
a composite sheet residing between the first and second fiberglass sheets and serving as a core, with each of the first and second fiberglass sheets being bonded to an opposing surface of the composite sheet to form a shell material for the envelope;
and wherein the method further comprises thermoplastically welding at least some of the cabinetry to the floor panel and to the overhead panel to form a structural uni-body.

25. The method of claim 24, wherein the right side panel and the left side panel are sealingly connected to the first continuous sheet of material by means of thermoplastic welding.

26. The method of claim 25, wherein:
the portion of the floor panel from the first continuous sheet of material represents a front portion and a rear portion, which together form 20% to 40% of a length of the floor panel; and
the fourth continuous sheet of material forms a remaining 60% to 80% of the length of the floor panel and resides between the front portion and the rear portion of the first continuous sheet of material, respectively.

27. The method of claim 25, wherein the shell material is between 0.5 inches and 2.0 inches in thickness.

28. The method of claim 27, wherein the composite sheet comprises a honeycomb pattern of plastic material and is between 0.5 inches and 2.0 inches in thickness.

29. The method of claim 19, wherein the envelope forms a box trailer.

30. The method of claim 29, further comprising wood planks residing between the trailer and at least the portion of the floor panel from the first continuous sheet of material.

31. The over-the-road vehicle of claim 19, wherein:
the chassis is a part of a two-axle truck; and
the envelope serves as a cargo compartment for the two-axle truck.

32. The method of claim 26, further comprising:
folding over the first continuous sheet of material to form the front wall, the back wall, the overhead panel, and the portion of the floor panel for the envelope.

33. The method of claim 32, further comprising:
pre-cutting one or more openings along (i) the left side panel, (ii) the right side panel, or (iii) both; and
after the left side and right side panels have been thermoplastically welded onto the first continuous sheet of material, installing a window onto each of the one or more openings.

34. The method of claim 32, wherein:
the floor panel comprises (i) a front abutment where the fourth continuous sheet of material meets the front portion of the first continuous sheet of material, and (ii) a second abutment where the fourth continuous sheet of material meets the rear portion of the first continuous sheet of material;
and the method further comprises:
providing at least two shims between the chassis and the floor panel;
securing a first of the at least two shims along the front abutment in overlapping relation to the first continuous sheet of material and the fourth continuous sheet of material; and
securing a second of the at least two shims along the rear abutment in overlapping relation to the first continuous sheet of material and the fourth continuous sheet of material,
thereby securing the first continuous sheet of material to the fourth continuous sheet of material.

35. The method of claim 34, further comprising:
securing the fourth continuous sheet of material to the chassis using bolts, rivets, or combinations thereof;
securing the shims at the front junction to the front portion of the first continuous sheet of material by means of an adhesive; and
securing the shims at the rear junction to the rear portion of the first continuous sheet of material by means of an adhesive.

36. A method of forming an envelope for an over-the-road vehicle, comprising:
creating a design for a three-dimensional object;
procuring a first two-dimensional sheet of bendable material;
forming an opening through the first two-dimensional sheet of bendable material to serve as an overhead vent opening;
bending the two-dimensional sheet to form:
a leading edge of a floor panel;
a front panel;
an overhead panel;
a back panel; and
a trailing edge of the floor panel, all as a first continuous sheet of material;
procuring a second two-dimensional sheet of material;
forming openings through the second two-dimensional material to serve as at least one window opening and a door opening;
procuring a third two-dimensional sheet of material;
cutting the second two-dimensional sheet of material to have a profile that matches a first side of the first continuous sheet of material;
thermoplastically welding the second continuous sheet of material to the first side of the first continuous sheet of material;

cutting the third two-dimensional sheet of material to have a profile that matches a second side of the first continuous sheet of material; and thermoplastically welding the third continuous sheet of material to the second side of the first continuous sheet of material, thereby forming the envelope.

37. The method of claim 36, further comprising:
procuring a fourth two-dimensional sheet of material;
securing a first end of the fourth two-dimensional sheet of material to a leading edge of the floor panel, and at a second end to a trailing edge of the floor panel, thereby enclosing the three-dimensional object and forming the envelope.

38. The method of claim 37, wherein securing the fourth two-dimensional sheet of material at the first end to the leading edge of the floor panel, and at the second end to the trailing edge of the floor panel, comprises:
abutting the first end of the fourth two-dimensional sheet of material against the leading edge of the floor panel, forming a front abutment;
abutting the second end of the fourth two-dimensional sheet of material against the trailing edge of the floor panel, forming a rear abutment;
placing a first shim under the front abutment;
securing the first end of the fourth two-dimensional sheet of material and the leading edge of the floor panel to the first shim;
placing a second shim under the rear abutment; and
securing the second end of the fourth two-dimensional sheet of material and the trailing edge of the floor panel to the second shim.

39. The method of claim 38, wherein each of the first shim and the second shim are fabricated from stainless steel.

40. The method of claim 37, further comprising:
providing a chassis having at least two wheels and a trailer hitch; and
securing the envelope to the chassis.

41. The method of claim 37, wherein the leading edge of the floor panel and the trailing edge of the floor panel comprise between 20% and 40% of the entire length of the floor panel.

42. The method of claim 37, further comprising:
forming equally spaced grooves into the first two-dimensional sheet of bendable material at (i) opposing ends of the overhead panel (ii) between the front panel and the leading edge of the floor panel, and (iii) between the back panel and the trailing edge of the floor panel;
and wherein bending the first two-dimensional sheet comprises bending the first two-dimensional sheet of bendable material along selected grooves.

43. An envelope for a recreational vehicle, comprising:
a first continuous sheet of material comprising sets of spaced-apart grooves, with the first continuous sheet of material being folded over at the grooves to form a front wall, an overhead panel, a back wall, and at least a portion of a lower panel;
a second continuous sheet of material forming a left side panel; and
a third continuous sheet of material forming a right side panel;

wherein:
the left side panel is thermoplastically welded onto the first continuous sheet of material on a first side of the first continuous sheet of material;
the right side panel is thermoplastically welded onto the first continuous sheet of material on a second side of the first continuous sheet of material;
and wherein:
each of the first, second, and third continuous sheets of material is fabricated from at least one pliable fiberglass sheet.

44. The envelope of claim 43, wherein each of the first, second, and third continuous sheets of material is comprised of:
a first fiberglass sheet;
a second fiberglass sheet; and
a composite sheet residing between the first and second fiberglass sheets and serving as a core, with each of the first and second fiberglass sheets being bonded to an opposing surface of the composite sheet to form the envelope;
and wherein the envelope further comprises a fourth continuous sheet of material also serving as a portion of the floor panel.

45. The envelope of claim 44, wherein:
the portion of the floor panel from the first continuous sheet of material represents a front portion and a rear portion;
the floor panel comprises (i) a front abutment where the fourth continuous sheet of material meets the front portion of the first continuous sheet of material, and (ii) a second abutment where the fourth continuous sheet of material meets the rear portion of the first continuous sheet of material;
and wherein the envelope further comprises:
at least one shim placed at the front abutment, overlapping the first continuous sheet of material and the fourth continuous sheet of material; and
at least one shim placed at the rear abutment, also overlapping the first continuous sheet of material and the fourth continuous sheet of material.

46. The envelope of claim 44, further comprising:
cabinetry residing within the envelop;
wherein the cabinetry and each of the first, second, and third continuous sheets of material is comprised of:
a first fiberglass sheet;
a second fiberglass sheet; and
a composite sheet residing between the first and second fiberglass sheets and serving as a core, with each of the first and second fiberglass sheets being bonded to an opposing surface of the composite sheet to form the envelope;
and wherein the cabinetry is secured to at least the first continuous sheet of material, the floor panel and to the overhead panel to provide structural stability to the envelope.

* * * * *